United States Patent
Herbert

(10) Patent No.: US 7,633,782 B1
(45) Date of Patent: Dec. 15, 2009

(54) 100% DUTY-CYCLE BUCK-DERIVED AND 0% DUTY-CYCLE BOOST-DERIVED POWER FACTOR CORRECTED (PFC) 3-PHASE AC-DC POWER CONVERTERS

(76) Inventor: Edward Herbert, 1 Dyer Cemetery Rd., Canton, CT (US) 06019-2029

( * ) Notice: Subject to any disclaimer, the term of this patent is extended or adjusted under 35 U.S.C. 154(b) by 202 days.

(21) Appl. No.: 11/943,864

(22) Filed: Nov. 21, 2007

Related U.S. Application Data

(60) Provisional application No. 60/866,613, filed on Nov. 21, 2006, provisional application No. 60/890,539, filed on Feb. 19, 2007.

(51) Int. Cl.
G05F 1/70 (2006.01)
H02M 7/02 (2006.01)

(52) U.S. Cl. .................... 363/125; 363/89; 363/124; 323/207

(58) Field of Classification Search .............. 363/81, 363/84, 9, 123, 124, 125; 323/205, 207
See application file for complete search history.

(56) References Cited

U.S. PATENT DOCUMENTS 5,502,630 A * 3/1996 Rokhvarg ............... 363/84
6,545,887 B2 * 4/2003 Smedley et al. .......... 363/89
6,731,524 B2 * 5/2004 Elek et al. ............... 363/70
7,139,180 B1 * 11/2006 Herbert .................. 363/124

* cited by examiner

Primary Examiner—Gary L Laxton

(57) ABSTRACT

This invention teaches power factor corrected 3-phase ac-dc power converters in which the duty-cycles are determined by "natural modulation", that is, they are forced by a fixed algorithm that has been optimized for efficient switching. The duty-cycles do not regulate the output voltage but they do force the input currents to be proportionately correct for good power factor. A feedback control circuit modulates the effective turns-ratio of a variable dc-dc transformer to regulate the output voltage. For a buck converter, the most efficient duty-cycle is 100%, that is, the buck switch is always on. For a boost converter, the most efficient duty-cycle is 0%, that is, the boost switch is always off. "100% duty-cycle" as defined for a buck 3-phase ac input means that there is no off-time. The switch duty-cycles are as follows: The duty-cycle for the phase with the highest voltage magnitude (the dominant phase) is 100%, and sum of the duty-cycles of the other two phases equals 100%. "0% duty-cycle" as defined for a boost 3-phase ac input means that the input is never short circuited line to line. The duty-cycle for the switch for the phase with the highest voltage magnitude (the dominant phase) is 0%, and switches of the other two phases modulate to control their respective input currents.

17 Claims, 17 Drawing Sheets

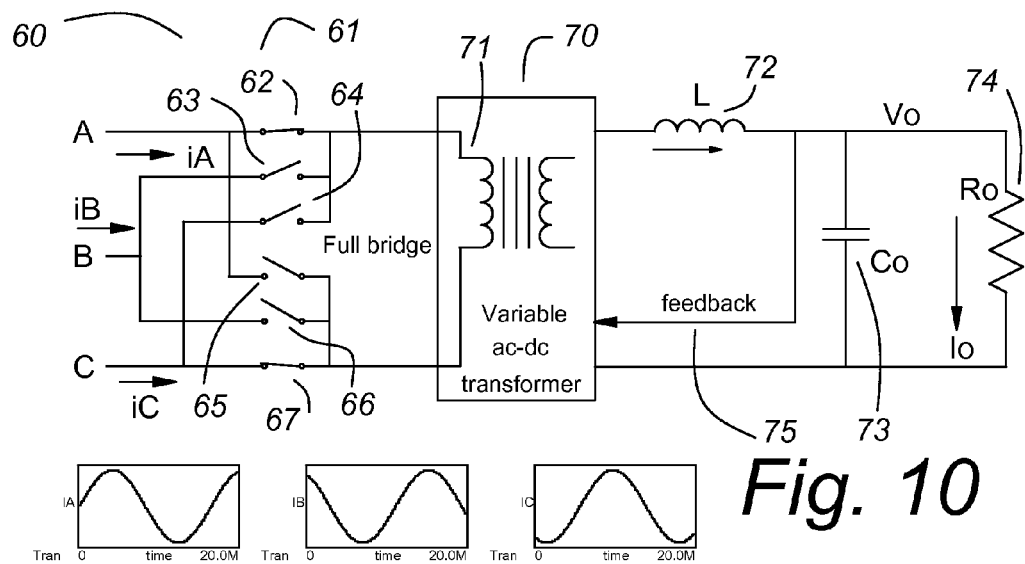
Fig. 10
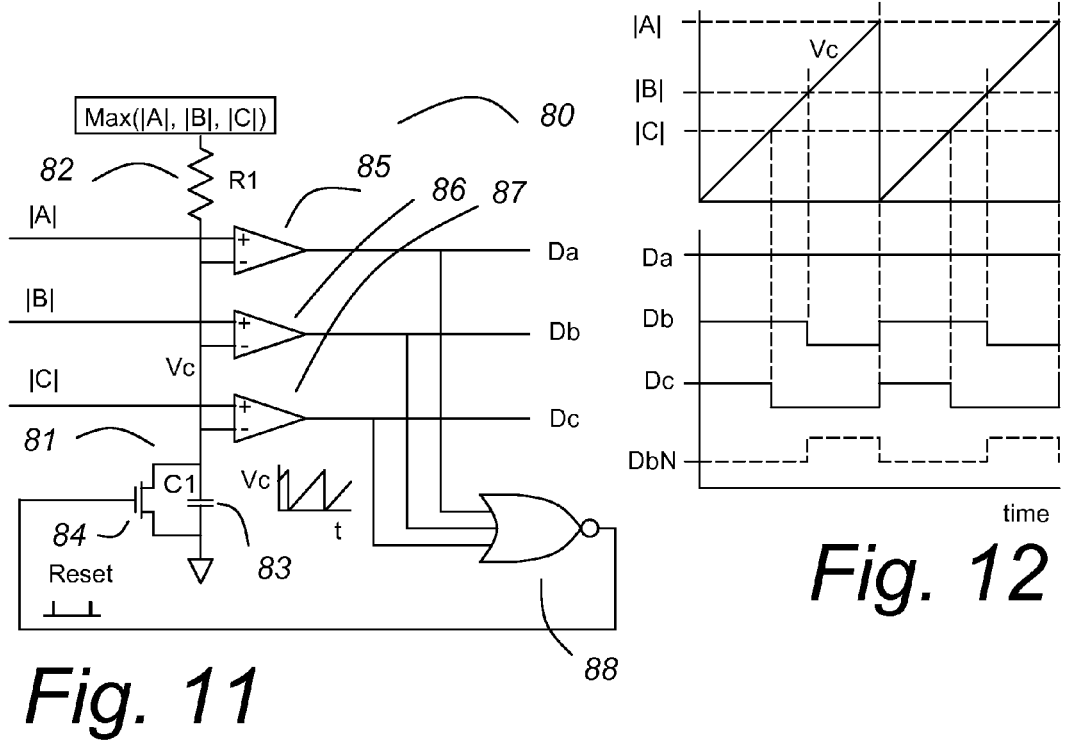
Fig. 11
Fig. 12

100% DUTY-CYCLE BUCK-DERIVED AND 0% DUTY-CYCLE BOOST-DERIVED POWER FACTOR CORRECTED (PFC) 3-PHASE AC-DC POWER CONVERTERS

CROSS REFERENCE TO RELATED PATENTS AND APPLICATIONS

This application is a continuation in part of a provisional U.S. patent application Ser. No. 60/866,613 filed Nov. 21, 2006 and entitled "3-phase PFC Ac-Dc Converter having "100 Percent Duty-cycle"". This application is also a continuation in part of a provisional U.S. patent application Ser. No. 60/890,539 filed Feb. 19, 2007 and entitled "100% Duty-Cycle Buck-Derived and 0% Duty-Cycle Boost-Derived PFC 3-Phase Ac-Dc Power Converters." Priority is claimed to the filing dates of these provisional U.S. patent applications and they are incorporated herein by reference.

This application relates to U.S. Pat. No. 5,132,606, issued Jul. 21, 1992 and entitled "Method and Apparatus for Controlling the Input Impedance of a Power Converter" and U.S. Pat. No. 5,144,222, issued Sep. 1, 1992 and entitled "Apparatus for Controlling the Input Impedance of a Power Converter". These patents are owned by the same entity as the present invention and they are incorporated herein by reference.

This application relates to U.S. Pat. No. 6,115,267, issued Sep. 5, 2000 and entitled "AC-DC Converter with No Input Rectifiers and Power Factor Correction." This patent is owned by the same entity as the present invention and it is incorporated herein by reference.

This application relates to U.S. Pat. No. 7,139,180, issued Nov. 21, 2006 and entitled "Three Phase Buck Power Converters Having Input Current Control." This patent is owned by the same entity as the present invention and it is incorporated herein by reference.

This application relates to a U.S. patent application Ser. No. 11/767,704 filed Jun. 25, 2007 and entitled "Power Factor Corrected Single-Phase AC-DC Power Converter Using Natural Modulation." This application is incorporated herein by reference.

This application relates to a U.S. provisional patent application Ser. No. 60/805,705, filed Jun. 23, 2006, and entitled "Using "Natural Voltage" to Maximize Efficiency in Power Converters". This application is incorporated herein by reference.

This application relates to a U.S. provisional patent application Ser. No. 60/807,056, filed Jul. 11, 2006, and entitled "Power Factor Corrected Single-Phase AC-DC Power Converter Using Natural Modulation". This application is incorporated herein by reference.

This application relates to a U.S. provisional patent application Ser. No. 60/807,499, filed Jul. 16, 2006, and entitled "Power Factor Corrected Single-Phase AC-DC Buck Power Converter". This application is incorporated herein by reference.

This application relates to a U.S. provisional patent application Ser. No. 60/820,993, filed Aug. 1, 2006, and entitled "Natural Voltage". This application is incorporated herein by reference.

The input or output stage for the power converters may be variable dc-dc transformer. Reference is made to U.S. patent application Ser. No. 11/423,957, filed Jun. 14, 2006 and entitled "Variable Transformer". This application is incorporated herein by reference.

The preferred high frequency dc-dc transformer input may use a coaxial push pull transformer. Reference is made to U.S. Pat. No. 7,119,648, issued Oct. 10, 2006, "Coaxial Push Pull Transformers for Power Converters and Like Circuits." This application is incorporated herein by reference.

The preferred high frequency dc-dc transformer input may use a cellular transformer. Reference is made to U.S. Pat. No. 7,023,317, issued Apr. 4, 2006, and entitled "Cellular Transformers." This patent is incorporated herein by reference.

The preferred high frequency dc-dc transformer and other circuits may use a simple power IC. Reference is made to U.S. patent application Ser. No. 11/307,252, filed Jan. 29, 2006, and entitled "Power Integrated Circuit." This application is included herein by reference.

The preferred high frequency dc-dc transformer and other circuits use ac switches. Reference is made to a provisional U.S. patent application Ser. No. 60/766,233, filed Jan. 3, 2006, and entitled "MOSFET Switches for AC Circuits" and to a U.S. patent application Ser. No. 11/619,127, filed Jan. 2, 2007 with the same title. These applications are incorporated herein by reference.

The preferred high frequency ac-dc transformer may use a dual source MOSFET for output synchronous rectifiers. Reference is made to U.S. patent application Ser. No. 10/905,668, filed Jan. 14, 2005, and entitled "Dual Source MOSFET for Low Inductance Synchronous Rectifier". This application is incorporated herein by reference.

BACKGROUND OF THE INVENTION

This application relates to power factor corrected (pfc) ac-dc power converters, and in particular, to 3-phase pfc ac-dc power converters. The usual way of controlling power factor in an ac-dc power converter uses a boost converter input stage, boosting all of the input current to a high voltage storage capacitor. Then, all of the output current is taken from the high voltage storage capacitor through a buck converter output stage to the output. A transformer may be used to provide dielectric isolation and/or change the output voltage level.

Prior art pfc circuits are sluggish, difficult to control and inefficient. Most require measurement of the input currents.

SUMMARY OF THE INVENTION

This invention teaches that a boost pfc 3-phase ac-dc power converter can be operated at 0% duty-cycle to maximize the efficiency of the pfc input.

This invention teaches that a buck pfc 3-phase ac-dc power converter can be operated at 100% duty-cycle to maximize the efficiency of the pfc input.

This invention teaches that 3-phase boost or buck converters operating, respectively, at 0% or 100% duty-cycles do not regulate their output voltages but that the voltage is known and linearly tracks the input voltage. For either circuit, this invention teaches that post regulation with any power modulator that can be controlled to have a constant output voltage will cause the circuit as a whole to have nearly ideal pfc on its input. A power modulator is defined as a circuit in which the power in equals the power out (neglecting losses, which are small), and in which the transfer ratio of the power modulator can be varied to control the output voltage with a varying input voltage.

This invention teaches that a pfc 3-phase boost converter may operate normally at 0% duty-cycle, to maximize efficiency, but that it may transition to a higher duty-cycle for under-voltage transients.

This invention teaches that a pfc 3-phase buck power converter may operate normally at 100% duty-cycle, to maximize efficiency, but that it may transition to a lower duty-cycle for over-voltage transients.

This invention teaches that either circuit can be operated in reverse because the circuits are reciprocal. The switches must be designed for the reversed current flow. Also, an ac-dc converter can be joined with a dc-ac converter to make an ac-ac converter.

This invention teaches that the preferred output power modulator is a variable dc-dc transformer. In a reciprocal circuit, the variable dc-dc transformer can be the input stage for a dc-ac converter.

This invention teaches that the buck input circuits can be integrated into a full-bridge primary drive circuit for a variable dc-dc transformer. The primary of the variable dc-dc transformer preferably is switched with a 100% duty-cycle, to maximize efficiency, but alternatively, it may be pulse-width-modulated to control over-voltage transients.

This invention teaches that the control for the 100% duty-cycle buck converter is very simple, and that no input current measurement is needed.

The control for the 0% duty-cycle boost converter is also very simple. The current control of the input currents senses a difference voltage between a current vector reference and a transformer center-tap. If the current vectors and the voltage vectors are not proportional, the voltage at the transformer center-tap will drift over time from that of the current vector reference. This difference voltage (error) can be used for feedback to modify the relative duty-cycles to correct the input currents with appropriate timing, gain and compensation for stability. For simplicity, a hysteretic control may be used, but a preferred control is taught that reduces ripple currents in the next stage. One skilled in the art of power converters would know how to design and use such feedback controls without undue experimentation.

BRIEF DESCRIPTION OF THE FIGURES

With reference to FIGS. 1 and 8.

With reference to FIGS. 1 and 8.

FIG. 10 shows that the inductor may be on the secondary side of the variable dc-dc transformer and that the input switches may provide the alternating excitation for the primary winding.

FIGS. 11 and 12 show a control concept for the 100% duty-cycle 3-phase pfc buck converter and its waveforms.

DETAIL DESCRIPTION

Figure 32:
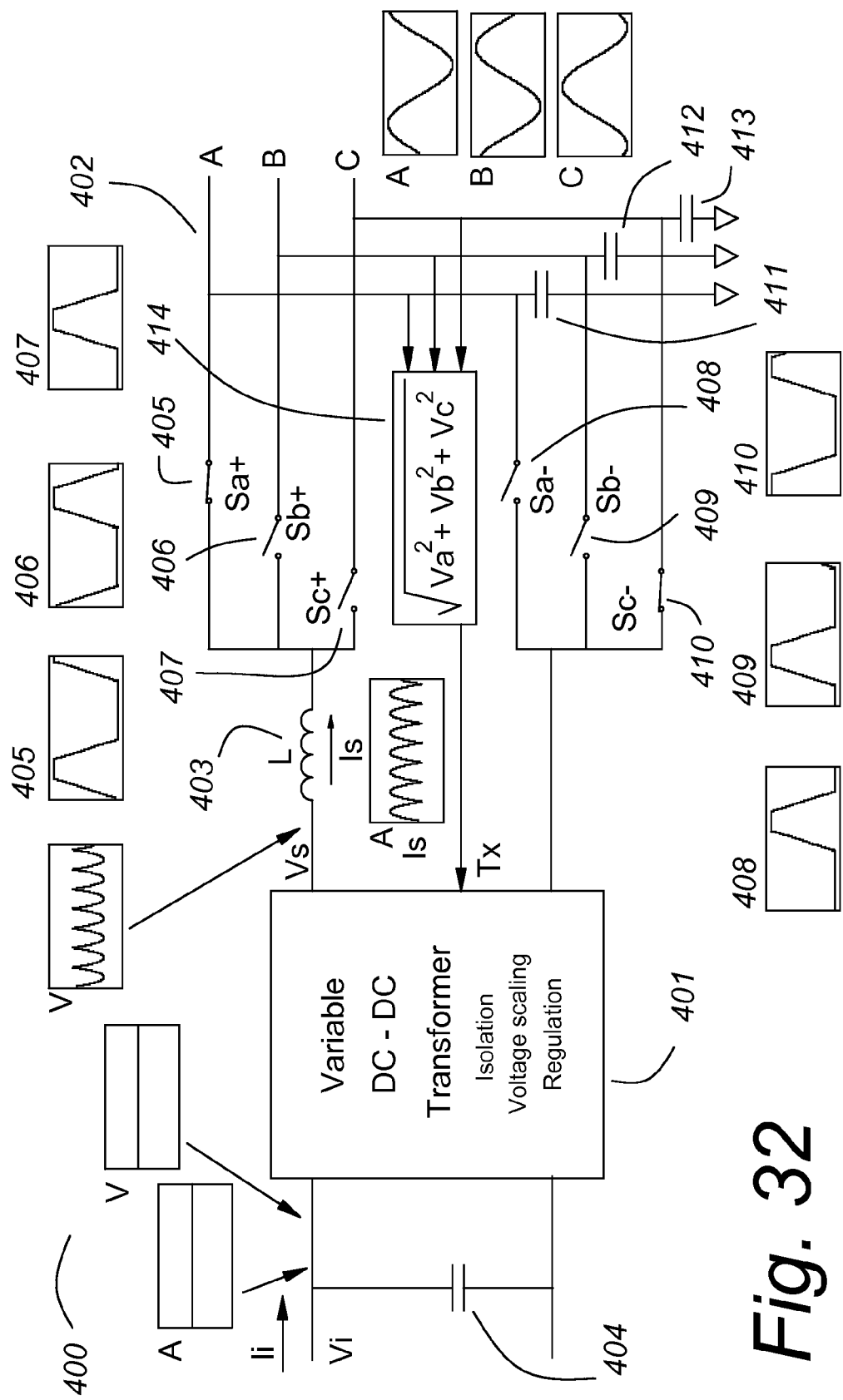
FIG. 32 shows a dc to 3-phase ac power converter using 100% duty-cycle for its output switches.
Figure 33:
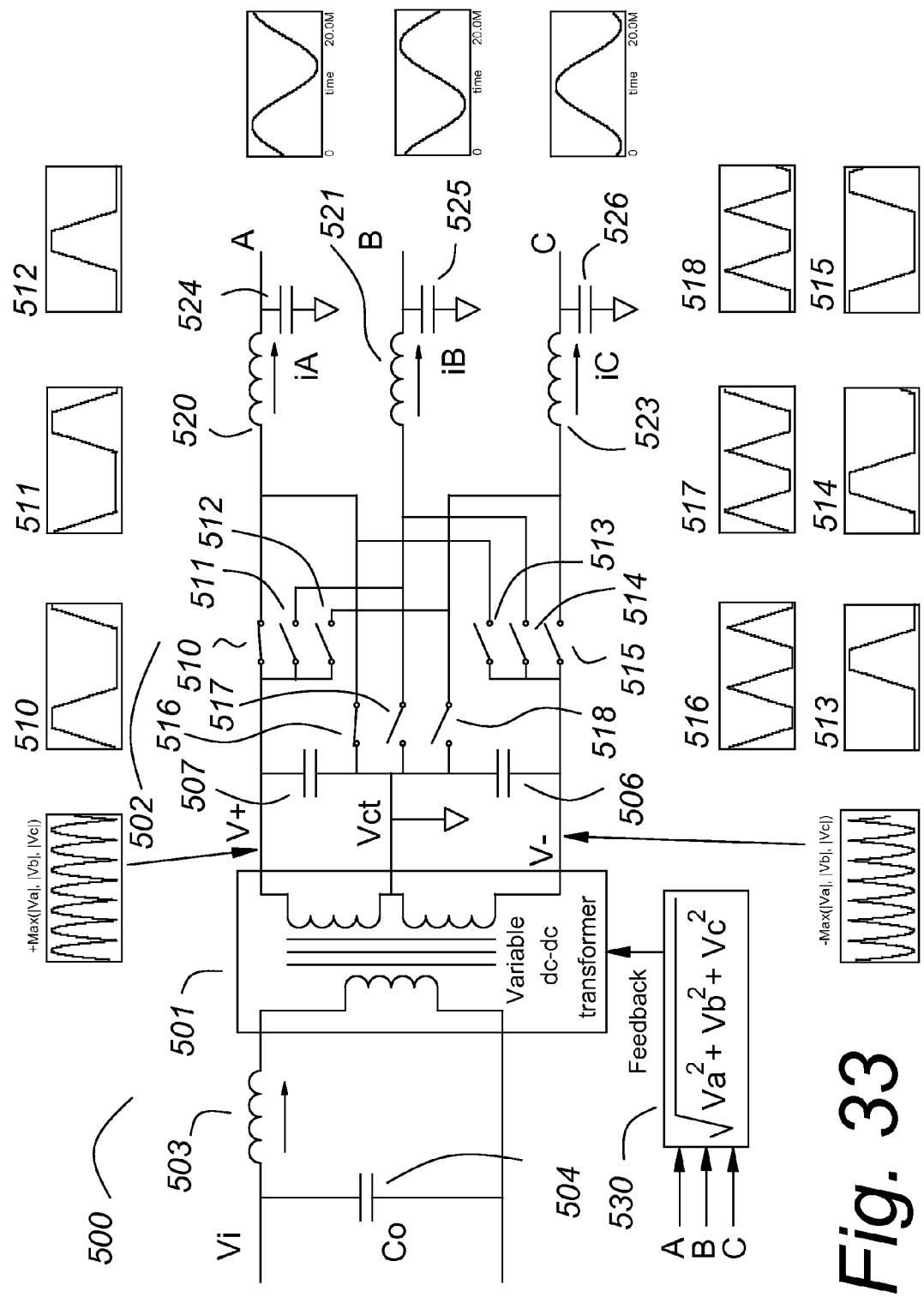
FIG. 33 shows another dc to 3-phase ac power converter using 100% duty-cycle for its output switches.

In the drawings, the same reference designator used in different drawings is the same item. In FIGS. 32 and 33, some small graphs are labeled with the same reference designator as the switches for which they are showing the duty-cycle.

Natural modulation is control by algorithm. The control algorithm uses measurement of the input voltage and feedback from the output voltage. Once the control algorithms are well understood, circuits implementing the control algorithms can be optimized for maximum efficiency. During normal operation, the duty-cycles of the power converters of this invention are determined by "natural modulation", that is, they are forced by a fixed algorithm that has been optimized for efficient switching. The duty-cycles do not regulate the output voltage but the do force the input currents to be proportionately correct for good power factor. A feedback control circuit controls the effective turns ratio of a variable transformer to regulate the output voltage.

Analysis of power (energy flow) shows that a 3-phase ac input is equivalent to a dc input. This leads to family of power-factor corrected (pfc) ac-dc converters with the dynamic characteristics and efficiency of dc-dc converters. For a buck-derived power converter, 100% duty-cycle is the most efficient. For a boost-derived power converter, 0% duty-cycle is the most efficient.

In a 3-phase pfc ac-dc converter operated with 100% duty-cycle (buck converter), or 0% duty-cycle (boost converter), the output voltage of the pfc front end is determined but it is not regulated and it will have a ripple component. The current relationship among the phases is controlled, and post regulation with any power modulator (power in equals power out, neglecting losses) completes the circuit, assuring nearly ideal pfc. A preferred power modulator is a variable dc-dc transformer, especially where isolation and a large step-down ratio are desired, as in a power factor corrected (pfc) 3-phase 120/208 ac to 12 V dc converter, as an example, not a limitation.

The design is optimized for maximum efficiency at the normal input voltage, which is well regulated for commercial power. For over-voltage and under-voltage transients, the operating mode may shift to a less efficient mode, but these are short transient conditions and the efficiency penalty is acceptable. Some power converters must operate for a wide range of input voltage, but many do not.

Some power converters that are specified for operation over a wide voltage actually need operate over two or three voltages with narrow bands around them for normal operation. As an example, an ac-dc converter specified for 90 to 260 V ac may actually need to operate at 100 V, 120 V and 240 V. In many cases, auto-ranging is preferred to a wide operating range. It is very difficult to optimize a power converter for a wide range of input voltages, and requiring it when it is not necessary is a significant waster of energy.

Figure 1:
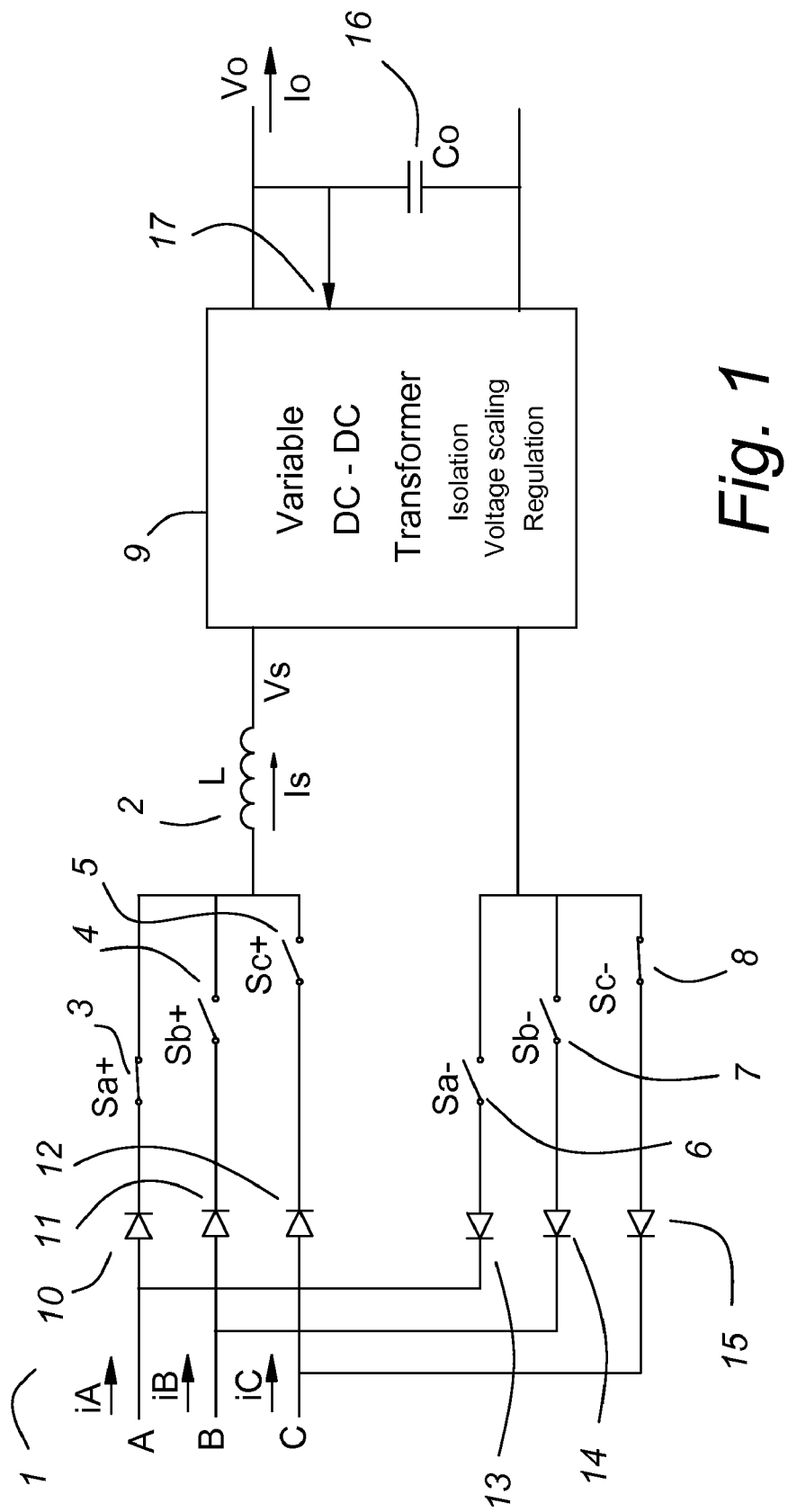
FIG. 1 shows a schematic of a 100% duty-cycle 3-phase pfc buck converter of this invention.

FIG. 1 shows a 3-phase pfc ac-dc buck converter 1 of this invention with a variable dc-dc transformer 9 on its output: Six input rectifiers 10-15 rectify the 3-phase ac input voltages, A, B and C. The input currents are, respectively, iA, iB and iC. A six-switch pfc input stage, switches 3-8, modulates the input voltages and switches them to the input of an inductor 2 (when positive) or the return of the variable dc-dc transformer 9 (when negative). An output filter capacitor 16 smoothes the dc output voltage Vo, and a feedback signal 17 controls the effective turns-ratio of the variable dc-dc transformer 9 to regulate the output voltage. It is contemplated that the six switches 3-8 operate at 100% duty-cycle, as defined below, for normal operation.

If the switches 3-8 are ac switches, the input rectifiers 6-15 are not needed. On either side, negative or positive, the duty-cycles of the switches are mutually exclusive, that is, one switch 3, 4 or 5 and one switch 6, 7 or 8 is on at any instant. If the duty-cycles of the switches have a reduced duty-cycle with a sinusoidal envelope, the output voltage Vs of the pfc stage is a dc voltage and the inductor current Is is a dc current. This power converter may revert to that mode for over-voltage transient conditions.

Figure 2:
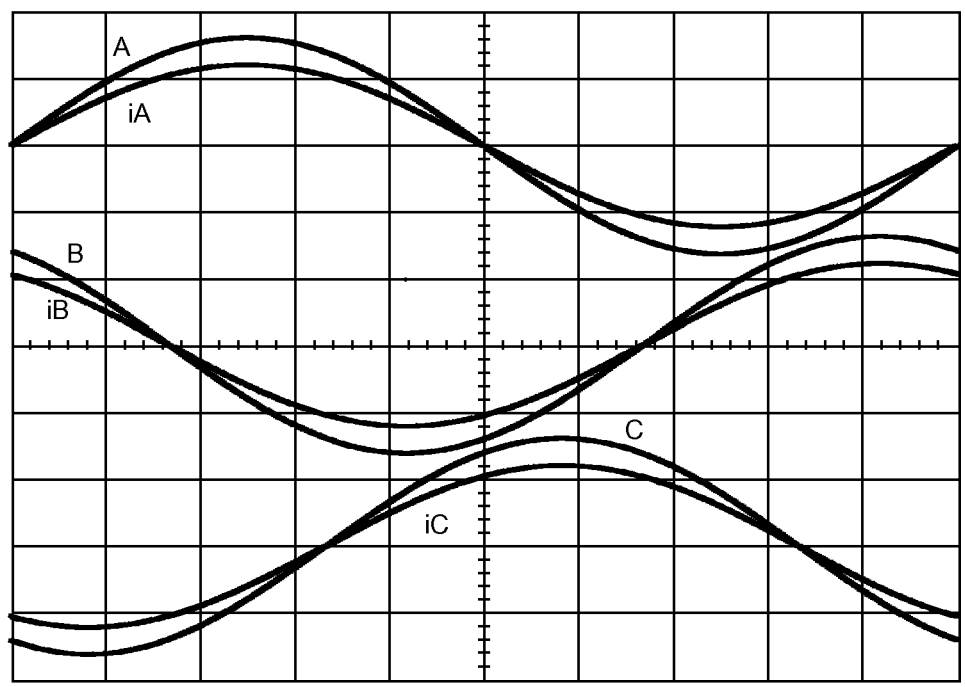
FIG. 2 shows the voltage and current waveforms for 3-phase pfc. The curves are from an average state SPICE simulation of a 100% duty-cycle 3-phase pfc ac-dc buck converter of this invention.

As shown in FIG. 2, the power factor correction (pfc) is nearly ideal. The curves are from an average state SPICE simulation of a 100% duty-cycle 3-phase pfc ac-dc buck converter of this invention. The 3-phase ac-dc power converters of this invention have nearly ideal input current waveforms for pfc. No input current measurement is used, and the control is very simple. FIG. 2 shows that the 3-phase currents iA, iB and iC, respectively, follow the waveforms of the 3-phase voltages A, B and C very well.

The duty-cycles are determined by "natural modulation", that is, they are forced by a fixed algorithm that has been optimized for efficient switching. The duty-cycles do not regulate the output voltage but they do force the input currents to be proportionately correct for good power factor. A feedback control circuit modulates the effective turns-ratio of a variable dc-dc transformer to regulate the output voltage.

Good power factor is forced, because the 3-phase ac-dc power converters are true power modulators, (power in equals power out, neglecting losses) with negligible internal energy storage. If the output voltage is controlled to be a dc voltage, the output power is constant (at steady state conditions), so the input power must be constant as well. This constrains the input power factor to be correct as long as the phase currents are kept proportional to their respective phase voltages, as follows:

$$\frac{iA}{A} = \frac{iB}{B} = \frac{iC}{C} = K$$

$$iA = K * A$$
$$iB = K * B$$
$$iC = K * C$$

where A, B and C are the respective 3-phase input voltages line to neutral and iA, iB and iC are the respective 3-phase input currents. K is a gain variable, common to all three phases. K can be modulated by feedback to control the output voltage, but for maximum efficiency, K is constrained to a high value to maximize the duty-cycles and optimize the efficiency.

Figure 3:
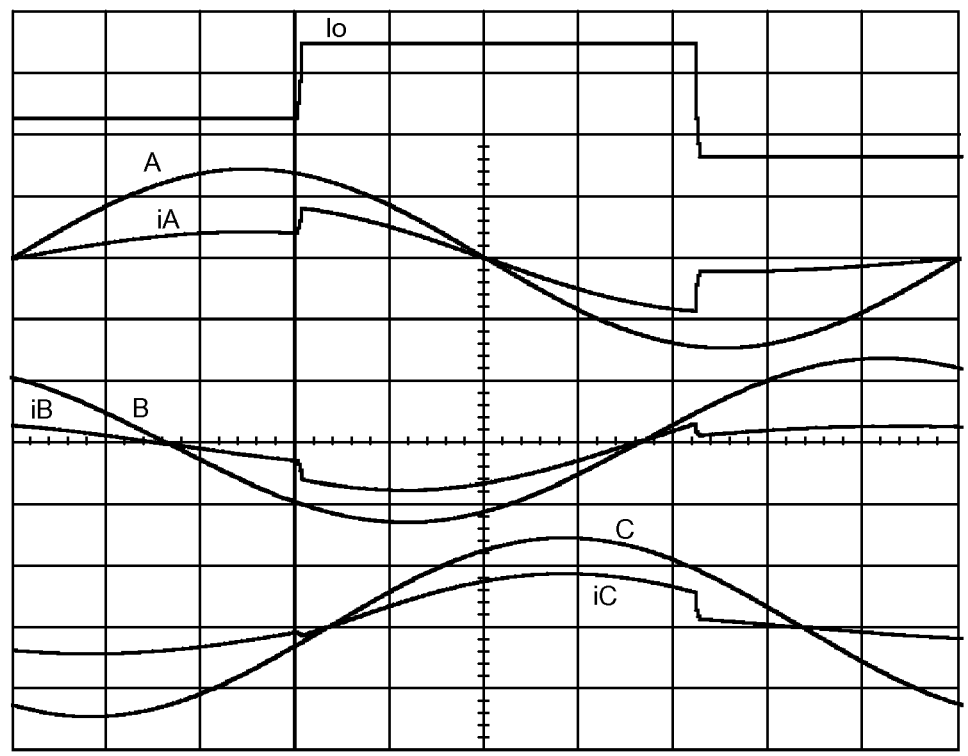
FIG. 3 shows the response of the input currents to load transients for the 100% duty-cycle 3-phase pfc ac-dc buck converter of this invention.

FIG. 3 shows that the dynamic response to load transients is very fast, similar to the response of a dc-dc buck converter. The curves are from an average state SPICE simulation of a 100% duty-cycle 3-phase pfc ac-dc buck converter of this invention. The graph above shows how step changes in the dc output current Io of a 3-phase pfc ac-dc power converter reflect to the 3-phase input currents iA, iB and iC. The 3-phase voltages A, B and C are shown as references.

There are no frequency limits on the 3-phase ac input, except that it must be low compared to the switching frequency. The circuit can operate at 0 Hz (dc) and it is not sensitive to phase rotation.

Figure 4:
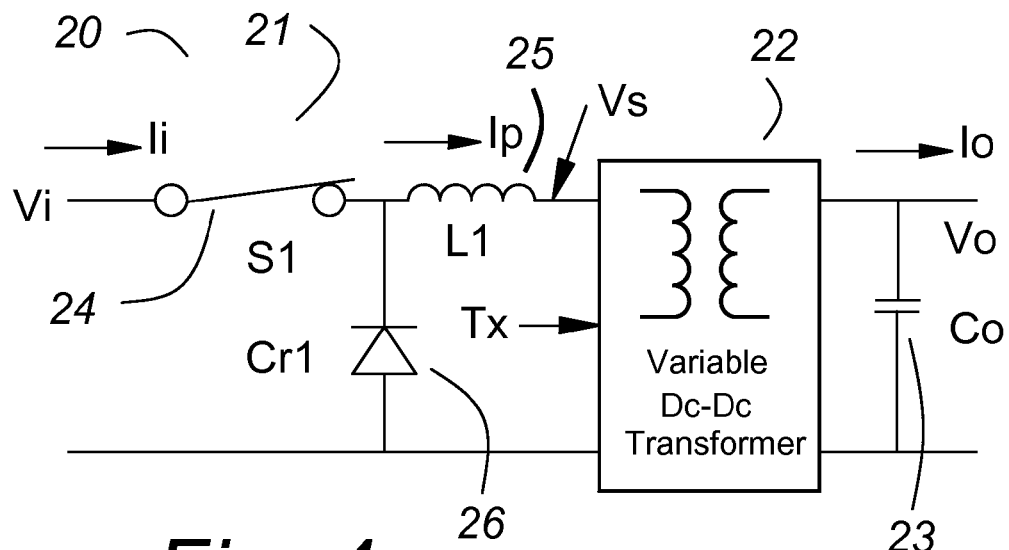
FIG. 4 shows a dc-dc power converter having a buck converter input and a variable dc-dc transformer, for background discussion.
Figure 5:
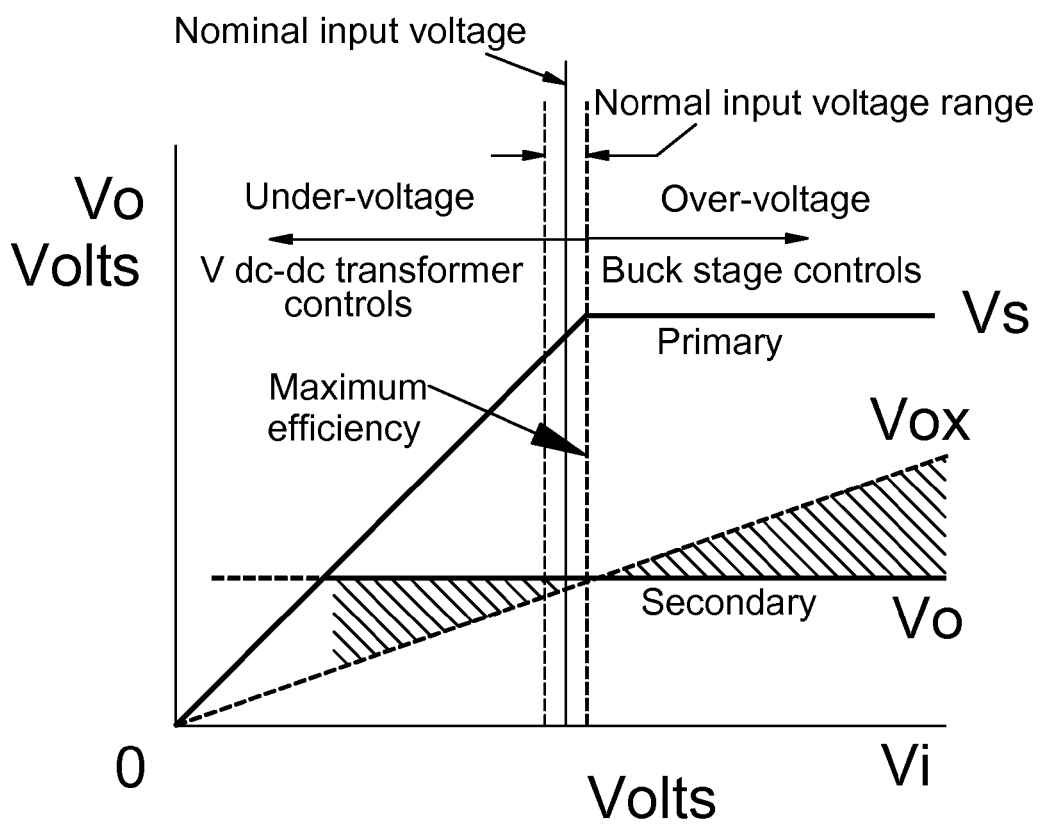
FIG. 5 shows the different modes of voltage control for different input voltages. For normal and under-voltage conditions, the variable dc-dc transformer regulates the output voltage. For over-voltage conditions, the buck converter input regulates the output voltage.

FIG. 4 shows a simple dc-dc power converter 20. It has a buck converter 21 as its first stage with a variable dc-dc transformer 22 output stage, to illustrate the concept of "natural modulation" for maximizing efficiency. FIG. 5 is a graph that shows the voltage relationships within the dc-dc power converter 20.

The buck converter 21 input stage has a buck switch 24 that pulse width modulates an input voltage Vi to a buck inductor 25. When the buck switch 24 is open, the current of the buck inductor 25 is conducted by a catch diode 26. An output filter capacitor 23 smoothes the output voltage Vo.

Maximizing efficiency: A buck-derived converter has its maximum efficiency when the duty-cycle is 100% (no off time.) A boost-derived converter has its maximum efficiency when the duty-cycle is 0% (no on time). For either case, the output voltage is defined, but not regulated, and it tracks the input voltage linearly.

At 100% duty-cycle, a buck converter is saturated and does not regulate its output voltage, but the duty-cycle can be reduced to accommodate over-voltage transients. For normal voltage and under-voltage transients, a boosting second stage controls the output voltage. The preferred boosting stage for a low voltage dc output is a variable dc-dc transformer, as it provides isolation and voltage level shifting.

At 0% duty-cycle, a boost converter is saturated and does not regulate its output voltage, but the duty-cycle can be increased to accommodate under-voltage transients. For normal voltage and over-voltage transients, a bucking second stage controls the output voltage. The preferred bucking stage for a low voltage dc output is a variable dc-dc transformer, as it provides isolation and voltage level shifting. However, the variable dc-dc transformer has limited range of control as a bucking stage, so the control range is extended by pulse width modulating the transformer primary drive switches for larger over-voltage transients.

The dc-dc power converter 20 of FIG. 4 is optimized for the normal input voltage range. A buck-derived input with a boost output is chosen to maximize efficiency at the normal operating input voltage. When the input voltage is in its normal range, the buck derived input stage is operated at 100% duty-cycle. The boost output stage may be the variable dc-dc transformer 22, to shift the voltage and provide isolation. If voltage shifting and isolation are not needed, the boost stage may be a boost switch to the return and a boost rectifier to the output. The boost circuit would be well known to one familiar with the art of power converters.

The curve Vox in the graph of FIG. 5 is what the output voltage Vo would be if a dc-dc transformer were used alone, with no variable turns-ratio nor buck-controlled input. Vo is the regulated output voltage. To the left of the maximum efficiency line, the output voltage Vo is boosted by reducing the effective turns-ratio of the variable dc-dc transformer 22. To the right of the maximum efficiency line, the dc-dc transformer 22 is saturated at its maximum effective turns-ratio, and the output voltage is controlled by operating the buck converter 21 with a reduced duty-cycle.

When the input voltage is in its normal range, the variable dc-dc transformer's 22 effective turns-ratio is nearly maximum, its most efficient state. The effective turns-ratio is reduced for lower input voltage conditions (brown-out or for hold-up following power interruption)—the input current increases and the efficiency is reduced, but the output voltage remains regulated.

During transient over-voltage conditions, the buck stage 21 has a reduced duty-cycle—the efficiency is reduced, but the output voltage remains regulated. In this mode, the average voltage into the variable dc-dc transformer Vs is flat with increasing input voltage Vi, as can be seen in FIG. 5.

Natural modulation can be used with power factor correction as well, both single-phase and 3-phase. See U.S. patent application Ser. No. 11/767,704, filed Jun. 25, 2007 and entitled Power Factor Corrected Single-Phase Ac-Dc Power Converter Using Natural Modulation. See also U.S. patent application Ser. No. 11/767,516, filed Jun. 24, 2007, and entitled ""Natural Modulation" for Maximizing Efficiency in Power Converters." These patent applications are incorporated herein by reference.

The switches in a 3-phase ac-dc converter cannot have 100 percent duty-cycle in the same sense as in a dc-dc buck converter, that is, all of the switches cannot always being turned on, but if the duty-cycle is viewed from the perspective of the voltage applied to the buck inductor, yes, the voltage can be applied continuously, 100 percent. With reference to FIG. 1, one of the positive side switches 3, 4 or 5 is always on, and one of the negative side switches 6, 7 or 8 is always on so that there is always line to line voltage applied to the inductor 2. In fact, the switch for the phase with the highest voltage magnitude and matching polarity can be on continuously as long as that condition persists, 60 degrees. Similarly defined, a 3-phase ac-dc boost converter can have 0 percent duty-cycle.

"100% duty-cycle" as defined for a buck 3-phase ac input means that there is no off-time. The switch duty-cycles are as follows: The duty-cycle for the phase with the highest voltage magnitude (the dominant phase) is 100%, and sum of the duty-cycles of the other two phases equals 100%.

"0% duty-cycle" as defined for a boost 3-phase ac input means that the input is never short circuited line to line. The duty-cycle for the switch for the phase with the highest voltage magnitude (the dominant phase) is 0%, and switches of the other two phases modulate to control their respective input currents.

Figure 6:
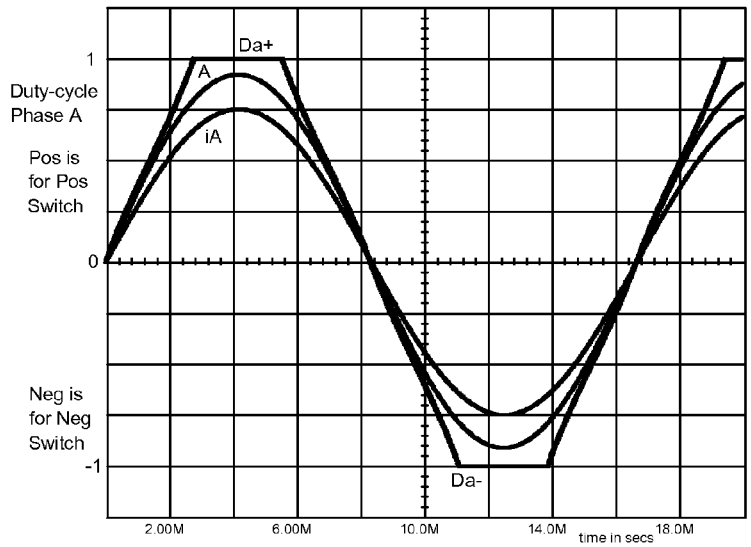
FIG. 6 shows the duty-cycle Da for the switches of phase A, as well as the input voltage A and the pfc corrected input current iA. The curves are from an average state SPICE simulation of a 100% duty-cycle 3-phase pfc ac-dc buck converter of this invention.

The phase that has the highest magnitude, positive or negative, is defined as the "dominant phase". The dominant phase changes at 60 degree intervals, and the polarity of the dominant phase alternates. FIG. 6 shows graphically the duty-cycle Da+ and Da- for the phase A positive side and negative side switches 3 and 6, respectively, of FIG. 1. The phase A input current iA and the phase A voltage are shown as well, for reference. The curves are from an average state SPICE simulation of a 100% duty-cycle 3-phase pfc ac-dc buck converter of this invention.

For maximum efficiency, the duty-cycle of the dominant phase is forced to be 100% (or 1). The duty-cycle of a buck pfc input with a dc output voltage is a sine term, with a proportionality constant K.

K may be varied to control the output voltage. To force a duty-cycle of 100%, the proportionality constant K is constrained to equal the inverse of the sine term, for example, 1/Sin X for phase A with 60<X<120 degrees phase angle, as follows:

For phase angle 60<X<120 (phase A is dominant):

$$Da = K * \mathrm{Sin}X$$

$$\text{Let } K = \frac{1}{\mathrm{Sin}X}$$

$$Da = 1$$

$$Db = K * \mathrm{Sin}(X+120) = \frac{\mathrm{Sin}(X+120)}{\mathrm{Sin}X} = \frac{B}{A}$$

$$Dc = K * \mathrm{Sin}(X+240) = \frac{\mathrm{Sin}(X+240)}{\mathrm{Sin}X} = \frac{C}{A}$$

where Da, Db and Dc are, respectively, the duty-cycles of the phase A, phase B and phase C switches. A negative duty-cycle result is interpreted as being a positive duty-cycle for a negative side switch. When one phase has the highest magnitude voltage, the other two phases have the opposite polarity.

For other phase angles, the equations are similar. The duty-cycle of the dominant phase, the one with the highest voltage magnitude, is 100%. The duty-cycles of the other two phases total to 100%.

For any phase angle $X$, $$Da = \frac{\mathrm{Sin}X}{\max\{|\mathrm{Sin}X|, |\mathrm{Sin}(X+120)|, |\mathrm{Sin}(X+240)|\}}$$

$$Db = \frac{\mathrm{Sin}(X+120)}{\max\{|\mathrm{Sin}X|, |\mathrm{Sin}(X+120)|, |\mathrm{Sin}(X+240)|\}}$$

$$Dc = \frac{\mathrm{Sin}(X+240)}{\max\{|\mathrm{Sin}X|, |\mathrm{Sin}(X+120)|, |\mathrm{Sin}(X+240)|\}}$$

This relationship constrains the phase currents to have the correct proportional relationship to each other for power factor correction.

When modeled in SPICE and graphed, as in FIG. 6, the curves for the duty-cycles of the non-dominant phases are nearly straight lines, and the duty-cycles of the non-dominant phases sum to 100%. The inductor sees continuous voltage on its input. There is no off time—that is how "100% duty-cycle" is defined for a 3-phase ac input. With the duty-cycle of the dominant phase constrained to be 100%, the pfc input stage has no ability to regulate voltage, but the pfc output stage voltage is determined and is proportional to the input voltage.

Figure 7:
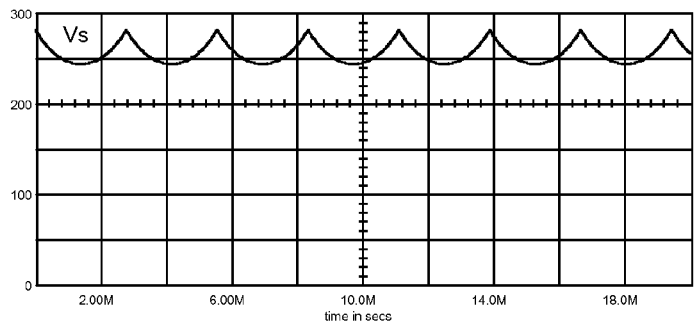
FIG. 7 shows the voltage Vs. The curve is from an average state SPICE simulation of a 100% duty-cycle 3-phase pfc ac-dc buck converter of this invention.

FIG. 7 shows a graph of the output voltage Vs of the 3-phase buck converter stage. The curve is from an average state SPICE simulation of a 100% duty-cycle 3-phase pfc ac-dc buck converter of this invention.

The inter-stage voltage Vs is given by:

$$V_S = \frac{3*Vp}{2*\max\{|\sin X|, |\sin(X+120)|, |\sin(X+240)|\}}$$

Vp is the peak ac input voltage.

The graph in FIG. 7 shows a SPICE simulation for Vs with 120/208 V ac input. The simulation is an average state simulation, not a pulse-by-pulse simulation. In a practical circuit, Vs is a varying voltage at the switching frequency, but the average voltage is as shown in FIG. 7.

Figure 8:
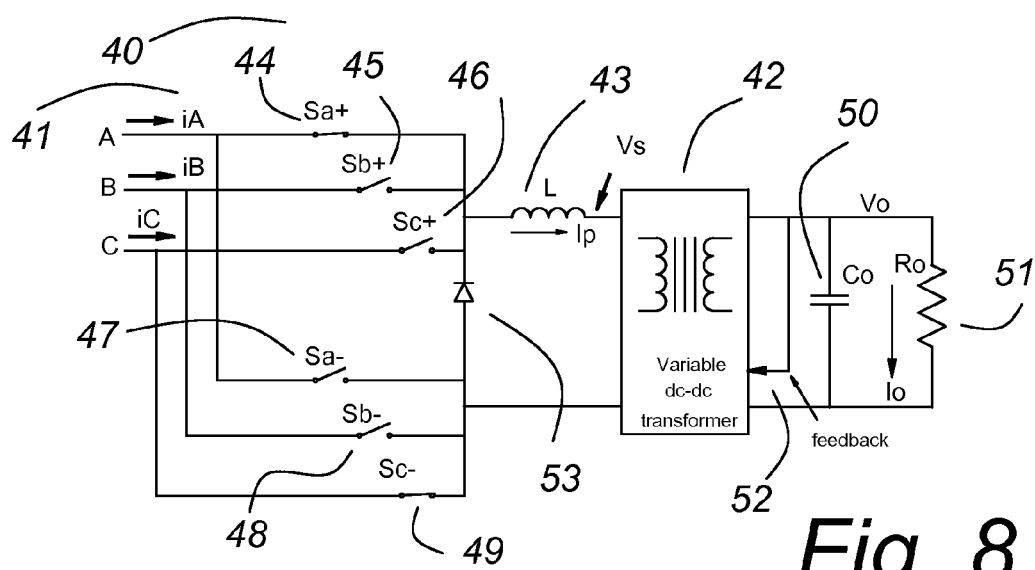
FIG. 8 shows the 100% duty-cycle 3-phase pfc ac-dc buck converter of FIG. 1 except that ac switches are used so that the input rectifiers are not needed.

The pfc 3-phase ac-dc power converter 40 of FIG. 8 is similar to the pfc ac-dc power converter 1 of FIG. 1, except that the buck converter 41 input stage uses ac switches 44 through 49 to switch the ac input voltages A, B and C to the inductor 43. A catch rectifier 53 conducts the current of an inductor 43 if the ac switches 44 through 49 are all off, as they may be part of the time in an over-voltage condition. An ac switch is defined as a switch that blocks voltage of either polarity when it is turned off. Back to back MOSFETs are commonly used as ac switches, as would be known by one skilled in the art of power converters. A variable dc-dc transformer 42 and an output capacitor 50 complete the circuit. The load is shown as a resistor 51. Feedback 52 is used to regulate the output voltage Vo by varying the effective turns-ratio of the variable dc-dc transformer 42.

If the output voltage Vs of the first stage were taken directly to a resistive load, the currents would peak just when the voltage peaks in the above graph in FIG. 7, and input currents iA, iB and iC would have a horrible wave form. However, if the output of the first stage is taken through any power modulator (power in equals power out, neglecting losses), and the power modulator is controlled such that its output is a dc voltage, then the input currents are controlled and have nearly ideal power factor. The reason for this is that the input of a power modulator has negative resistance characteristics—as the voltage goes up, the current goes down—and this corrects the input current by the right amount.

A variable dc-dc transformer is a good power modulator. As the input voltage is reduced, decreasing the effective turns-ratio of the transformer maintains the output voltage at the correct level. The variable dc-dc transformer therefore has boost characteristics. At very low input voltages, the input current increases substantially, which limits the range of continued operation for reduced input voltage. The range is extended lower if there is corresponding load shedding.

An equivalent dc circuit is a buck converter input with a boost converter output. The buck converter is operated at 100% duty-cycle (always on) except during over-voltage transients.

Figure 9:
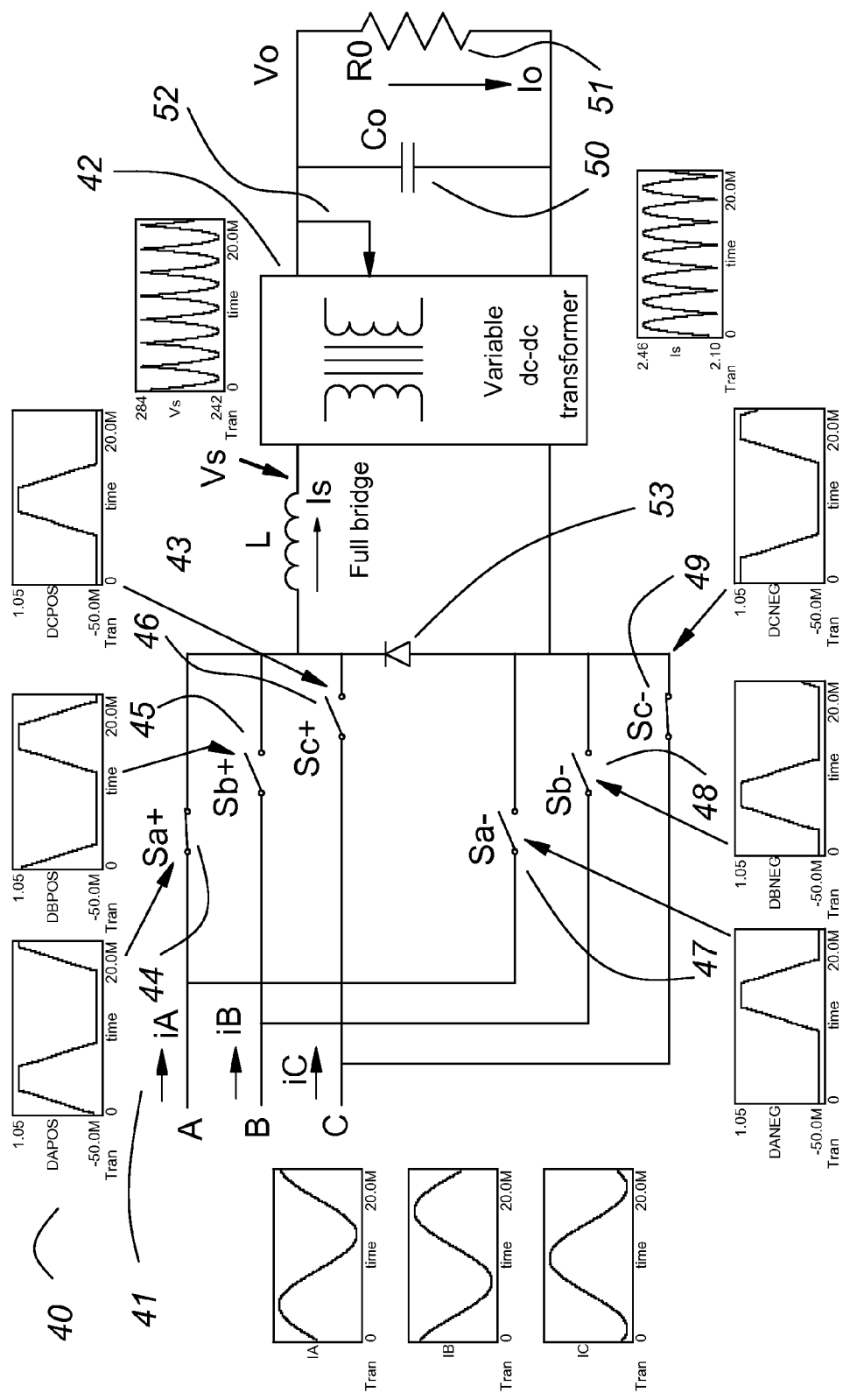
FIG. 9 is the circuit of FIG. 8 with waveforms from an average state SPICE simulation.

FIG. 9 shows an enlarged copy of the pfc 3-phase ac-dc power converter 40 of FIG. 8. Copied and pasted onto FIG. 9 are the results of a SPICE simulation of an average state model of the pfc 3-phase power converter 40. The small graphs are generated using the SPICE probe function and show the three phase input currents, the duty-cycle of each switch and the average interstage voltage Vs and current Is.

FIG. 10 shows a 3-phase pfc ac-dc buck converter 60 having 100% duty-cycle with a variable ac-dc transformer 70 having a full bridge primary winding 71. Six ac switches 62-67 provide both the correct switching for power factor correction and also the high frequency alternating excitation for the primary winding 71. The output of the variable ac-dc transformer 70 goes to an output inductor 72 and then to an output capacitor 73 and a load 74. Feedback 75 may be used with appropriate control circuits to modulate the turns-ratio of the variable ac-dc transformer 70. The variable transformer is shown in more detail in U.S. patent application Ser. No. 11/423,957 filed Jun. 14, 2006 and entitled "Variable Transformer." This application is incorporated herein by reference.

This 3-phase pfc ac-dc converter has efficiency comparable to a dc-dc transformer with a 100% duty-cycle full-bridge primary winding. During over-voltage transients, the duty-cycle may be reduced, to maintain regulation. For normal input voltage and under-voltage transients, the effective turns-ratio of the variable ac-dc transformer is modulated to regulate the output voltage.

The primary winding of the variable ac-dc transformer is a full-bridge winding, that is, a single winding. Its duty-cycle is 100%, meaning that there is never any significant off-time (0 volts) on the input of the transformer, nor on the secondary side inductor. One positive and one negative side switch is always on (except during over-voltage transients.) The trade-off benefit is the elimination of separate primary switches for a variable dc-dc transformer, which reduces the parts count and eliminates their losses. The penalty is that the dominant phase switches must switch alternately to provide a high-frequency ac excitation to the transformer.

The equivalent dc circuit is a variable dc-dc transformer coupled buck converter with a 100% duty-cycle full-bridge primary winding. The dc full-bridge circuit has four switches and the 3-phase equivalent has six ac switches. In both circuits, one high-side switch and one low-side switch are on at any given time, so the conduction losses are comparable.

Another difference in FIG. 10, compared to FIGS. 1, 8 and 9, is that the inductor 72 is on the secondary side of the variable ac-dc transformer 70. This is necessary with the switch scheme of FIG. 10 and an option for the switch scheme of FIGS. 1, 8 and 9.

FIGS. 11 and 12 show, respectively, the fundamental parts of a simple control 80 and a graph of its important waveforms. The control 80 has an integrator 81 having a capacitor 83 and a resistor 82. To have an approximately straight-line charging voltage curve, the input voltage on the resistor 82 must be large compared to the ramp voltage Vc on the capacitor 83. Alternatively, one skilled in the art of analog circuits would know how to make a precision integrator using an operational amplifier.

Periodically the charging ramp Vc is reset with a Reset pulse to the gate of a MOSFET 84. Three comparators 85-87 compare three input signals |A|, |B|, and |C| to the charging ramp voltage Vc, and the respective outputs Da, Db and Dc of the respective comparator 85, 86 or 87 go low when the charging ramp voltage Vc rises to equal the respective input signal |A|, |B| or |C|. The input signals |A|, |B| and |C| are preferably low voltage analog signals generated from the phase A, B and C voltages using scaling and precision full wave rectifiers, though one skilled in the art of analog circuits would know a variety of ways to accomplish this function that would be equivalent.

Figure 13:
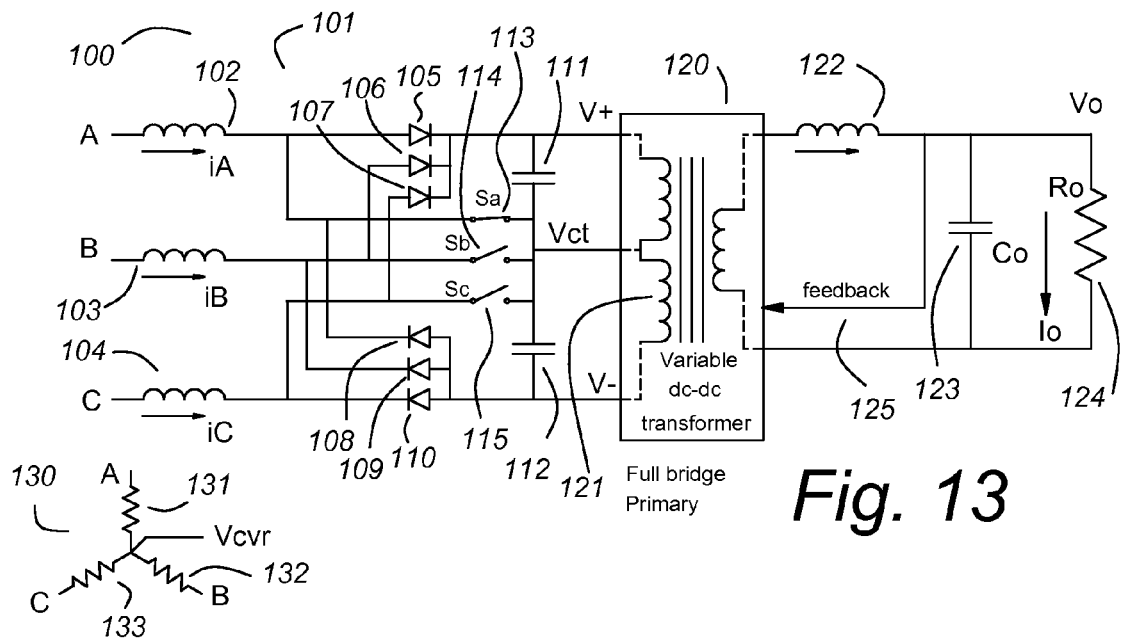
FIG. 13 shows a 0% duty-cycle pfc 3-phase ac-dc boost converter of this invention.

Note that no connection to a neutral line is shown and none is needed. With phase imbalance, using the power neutral line as a reference may not be optimum, and it may not be possible if a neutral line is not provided. For control purposes, it is preferred to generate a current vector reference Vcvr as the junction of three equal resistors that are connected to the phase voltages A, B and C in a "Y". An example is shown in FIG. 13, where a reference circuit 130 has three resistors 131-133 connected respectively to the phase voltages A, B and C. Of course, the absolute value voltage references |A|, |B| and |C| have Vcvr as their reference as well.

It is preferred that the period of the switching cycle be synchronized to the charging time that the charging ramp voltage Vc takes to reach the value of the dominant phase voltage |A|, |B| or |C|. The dominant phase is the one with the highest voltage magnitude at any given instant of time. One way to accomplish this is to use a logic gate 88 sensing the comparator outputs Da, Db and Dc and generating the Reset pulse when all are low, which occurs when the ramp voltage Vc equals the dominant phase input |A|, |B| or |C|. The reference function Max(|A|, |B|, |C|) tends to keep the charging ramp period fairly constant as the voltages vary over the ac line frequency cycle.

In theory, the output signals Da, Db and Dc have the right timing to implement the duty-cycle equations given above, but for practical reasons, they should not be used directly. For one, there may be small timing glitches in the dominant phase output signal, Da, Db or Dc, and these should be blanked so that the respective switch is on continuously. The duty-cycles of the other two switches must be mutually exclusive for many embodiments of the invention, so it is preferred to chose one of the non-dominant duty-cycle pulses for control and the other duty-cycle is simply the inverse of that one. For example, with reference to FIG. 12, the dashed line DbN is the inverse of Db, it has the same period as Dc, and it is preferred for the control of the switches for phase C at the point in the ac cycle captured in FIG. 12.

There are many ways to implement the timing and control circuits to achieve the required timing per the equations for the Da, Db and Dc and to accommodate the practical requirements of practical circuits. One skilled in the art of power converters and control circuits would understand how to use t this invention without undue experimentation. Digital controls are becoming increasingly popular, and a digital signal processor (dsp) may be a good choice as a means for control for many applications.

FIG. 13 shows a pfc 3-phase boost derived ac-dc power converter 100. The boost converter embodiment of the invention has the advantage of having inductors on its inputs and an inductor on its output, so noise within the circuit is better contained and the need for external emi filters is reduced or eliminated. The boost embodiment also can change its mode of operation to provide regulation for under-voltage conditions.

Whether the buck or the boost configuration is used, there is no switching in the dominant phase, defined as the phase that has the highest voltage magnitude at any instant. The phase that is dominant changes at 60 degree phase intervals and the polarity alternates positive and negative. One half of the power is transferred directly to the output of the pfc stage without switching. There are no switching losses in the dominant phase.

The duty-cycles are determined by "natural modulation", that is, they are forced by a fixed algorithm that has been optimized for efficient switching. The duty-cycles do not regulate the output voltage but they do force the input currents to be proportionately correct for good power factor. A feedback control circuit modulates the effective turns-ratio of a variable dc-dc transformer to regulate the output voltage.

In the 100% duty-cycle buck converter, the inductor input voltage never goes to zero, so the buck inductor can be much smaller and its losses are significantly reduced. The buck switches are not switching when their phase is dominant, so there no switching losses at the times of peak voltage and current. The emi generated is significantly less as well, requiring less input filtering.

In the 0% boost converter, the input voltage to the boost diode never goes to zero while its phase is dominant, that is at its maximum voltage and for 30° each side of maximum. The boost switch is not switching when its phase is dominant, so there are no switching nor conduction losses in the boost switch at the times of peak voltage and current. The inductor does not have any high frequency ripple during that time period, so its losses are significantly reduced. The voltage is never boosted above the peak ac voltage, so the stress on the boost diodes and its losses are significantly reduced as compared to most boost pfc circuits. The emi generated is significantly less as well.

Neither the buck converter nor the boost converter has a connection to the neutral, and neither converter uses direct measurement of the input currents.

In the pfc 3-phase boost derived ac-dc power converter 100 of FIG. 13, a 3-phase boost input stage 101 provides a positive voltage V+, and a negative voltage V− to a variable dc-dc transformer 120. The connections to the rest of the circuit within the variable dc-dc transformer 120 are shown dashed, as they are not literal. Variable dc-dc transformers are discussed later in this specification and they include switching and rectifying circuits so that as an entirety the variable dc-dc transformer accepts a dc input voltage and provides a dc output voltage. Because of the coupling through the primary winding 121 and the internal primary switching circuits, the voltages V+ and V− have equal voltage and opposite polarity with respect to the transformer center-tap voltage Vct.

An inductor 122 and an output capacitor 123 filter the output voltage of from the variable dc-dc transformer 120 to provide the output voltage Vo. An output current Io flows through the load, shown as a resistor 124. Feedback 125 is provided from the output voltage Vo to the variable dc-dc transformer 120 to control the effective turns-ration so as to keep the output voltage Vo at a constant value.

In the 3-phase input boost circuit 101, three input inductors 102-104 connect respectively, individually, through positive boost rectifiers 105-107 to a positive boost capacitor 111 and connect respectively, individually, through negative boost rectifiers 108-110 to a negative boost capacitor 112. Three boost switches 113-115 can short, respectively, individually, the three input inductors 102-104 to the transformer center-tap, which is also the connection of the positive to the negative boost capacitors 111 and 112.

In many pfc circuits the boost capacitors store significant energy, perhaps to smooth the line frequency ripple of a single phase pfc circuit or for significant hold up time. The positive and negative boost capacitors 111 and 112 preferably are small and do not store much energy. Optimally, they smooth the voltage waveforms at the switching frequency but the time constant is small compared to the period of the line frequency inputs. Excess energy storage compromises the ability of the power converter to correct the power factor of the input currents iA, iB and iC. If greater energy storage is needed, as for hold up time, it is preferred that it be provided in another circuit.

During normal operation, the boost switch 113, 114 or 115 that is associated with the dominant phase (the phase A, B or C that has the highest voltage magnitude at an instant) is open and is not switching. Assuming that there is sufficient load current through the variable dc-dc transformer 120 to bleed the boost capacitors 111 and 112 so that they do not peak charge, the dominant phase voltage, positive or negative, will be impressed on the respective positive or negative boost capacitor 111 or 112 through whichever of the respective positive or negative boost rectifiers 105-110 is forward biased. Through the coupling of the variable dc-dc transformer 120, the same voltage but of opposite polarity will be mirrored on the other respective negative or positive boost capacitor 112 or 111.

By definition, the dominate phase A, B or C has the highest voltage magnitude, so the respective boost rectifiers 105 to 110 of the other two phases are reverse biased in the absence of operation of one or more of the boost switches 113, 114 and 115, and no current can flow except through the circuit of the positive and negative boost capacitors 111 and 112 and the primary winding 121 of the variable dc-dc transformer 120. If any load is present, this will discharge the positive and negative boost capacitors 111 and 112, causing the voltage of the transformer center-tap Vct to drift toward the voltage of the dominant phase. Eventually, one of the other boost diodes 105-110 will become forward biased and current will flow, phase to phase, but the currents iA, iB and iC would not be balanced for pfc.

For power factor correction (pfc), the currents iA, iB and iC are in phase with the respective voltages A, B and C, and in correct proportion in accordance with the following equations:

$$\frac{iA}{A} = \frac{iB}{B} = \frac{iC}{C} = K$$
$$iA = K * A$$
$$iB = K * B$$
$$iC = K * C$$

Further, when one phase is dominant, the other two phases are of opposite polarity. Also, the sum of the currents is 0. Accordingly, the sum of the currents of the two non-dominant phases equals the current of the dominant phase. The respective boost switches 113, 114 or 115 of the non-dominant phases must operate in a pulse width modulated fashion to control the currents iA, iB or iC of the non-dominant phases. When one of the switches 113, 114 or 115 is closed, the respective current iA, iB or iC increases, and when the switch opens, the current in the respective inductor 103, 104 or 105 continues to flow, forward biasing its respective boost rectifier 105-110. When the switch is open, the current decreases, and by pulse width modulating between closed and open, the currents may be controlled in the usual manner of a boost converter, as would be well understood by one skilled in the art of power converters.

Usually in pfc boost converters, the input current is measured, compared to a reference, and the duty-cycle of the boost switch is modulated to control the current to the correct value at any instance. The present invention may use current measurement and control, but for many applications a simpler measurement may be used. Conventional current measurement techniques are complicated and may degrade efficiency, so there is advantage in not using them.

In the 3-phase boost converter of the present invention, there is a very simple measurement that can be made to ensure that the currents are correct and to adjust them if they are not. A three leg voltage divider 130 having three equal value resistors 131-133 is used to generate a current vector reference voltage Vcvr. In the 3-phase power converters of this invention, no connection need be made to the neutral wire of the 3-phase input, and the voltage of a hard-wired power neutral may not be optimum for control if there is imbalance in the phase voltages A, B and C.

The current vector reference voltage Vcvr represents the vector sum of the three phase voltages A, B and C. The vectors of the three phase currents iA, iB and iC must be proportional and in phase with the respective vectors of the three phase voltages A, B and C. If this is true, the voltage on the transformer center-tap Vct will equal the voltage on the current vector reference voltage Vcvr. If it is not, the magnitude of the difference indicates the magnitude of the current error, and the phase angle of the difference voltage indicates which phase currents iA, iB or iC are erroneous. Control circuits are discussed in more detail further on in this specification. (Precisely, the difference voltage indicates the magnitude of the accumulated charge on the boost capacitors 111 and 112 due to errors in the currents. Effective control of the currents keeps the difference voltage small.)

With imbalanced phase voltages A, B and C, the current vector reference is different than the line neutral voltage (if a line neutral is present), and the difference is beneficial to current balance among the phase currents iA, iB and iC. In a power converter that is generating constant output power, the inputs have negative dynamic resistance, that is, if the voltage goes down, the current goes up proportionately so that V*I=P remains constant (for steady state conditions). By controlling the non-dominant phase currents relative to the dominant phase current, the center-tap voltage Vct can be shifted at will, and it is the difference between a phase input voltage, A, B or C and the voltage Vct that determines the voltage across the respective input inductor 102, 103 or 104. The other relationships follow from that same voltage and controlling the center-tap voltage Vct to equal the current vector reference voltage Vcvr effectively generates a new "virtual neutral" in reference to which the phase voltages A, B and C are more nearly in balance. This results in more balanced phase currents iA, iB and iC than if the line neutral were used as the reference. Of course, if there is no line neutral available, the alternative is line-to-line control, which is not attractive for many reasons.

In 3-phase power systems, neutral current resulting from phase imbalance is very undesirable. The ultimate way of avoiding neutral current is not to connect power components to the neutral.

Figure 14:
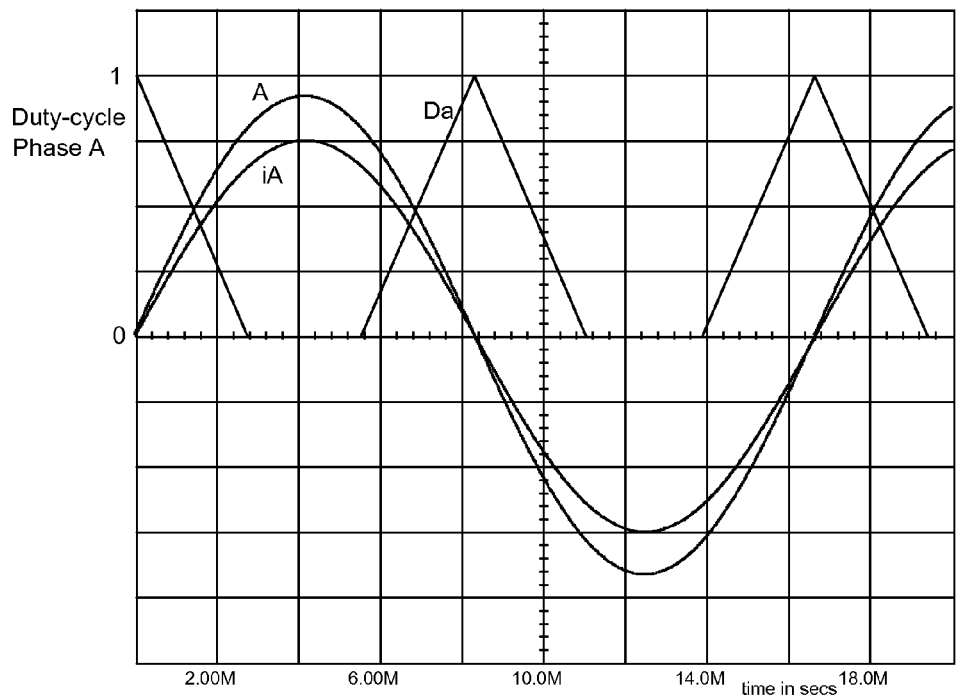
FIG. 14 shows the duty-cycle Da for phase A for the 0% duty-cycle 3-phase pfc boost converter of FIG. 13 as well as the phase A input voltage A and the pfc current iA. The curves are from an average state SPICE simulation of a 0% duty-cycle 3-phase pfc ac-dc boost converter of this invention.

FIG. 14 shows the waveforms from an average state SPICE simulation for the voltage A, the current iA and the boost switch 113 duty-cycle Da for the pfc 3-phase boost power converter 100 of FIG. 13. Note that the duty-cycle Da goes to zero while the phase A voltage A is at its peak and for 30° each side of peak. Note the near ideal waveform of the current iA.

Figure 15:
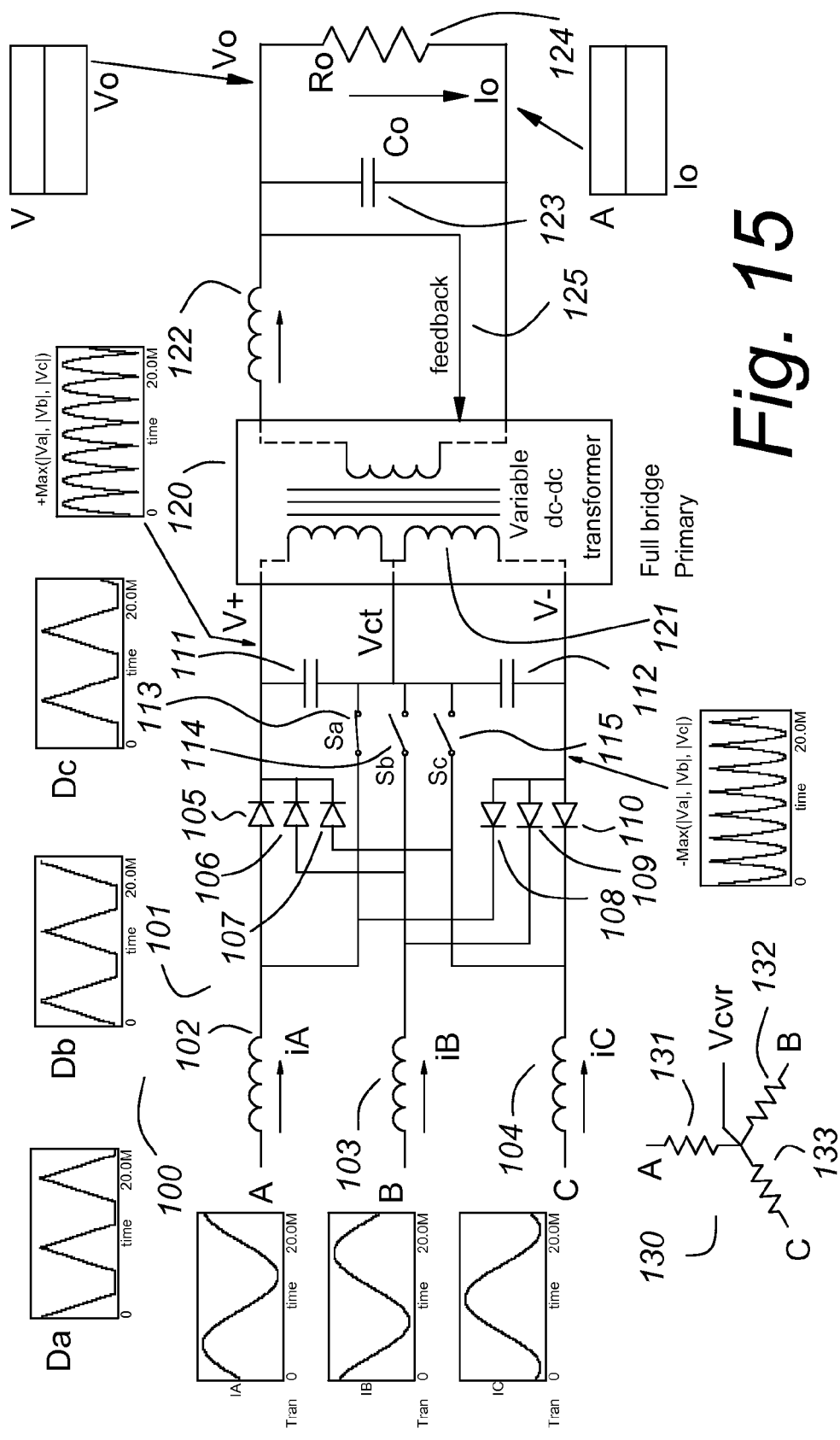
FIG. 15 is the circuit of FIG. 14 with waveforms from an average state SPICE simulation.

FIG. 15 repeats the schematic of FIG. 13 but in addition shows small graphs copied and pasted from the average state SPICE simulation using the SPICE probe function. The input currents iA, iB and iC are nearly ideal. The duty-cycles Da, Db and Dc can be seen to go to zero when the respective phases are dominant. The voltages V+ and V− on the boost capacitors 111 and 112 can be seen to track the peak voltage magnitude voltage of the dominant phases in turn.

Buck converters and boost converters are reciprocal devices and are governed by similar voltage relationships if the differences in current flow and so forth are reconciled. One important difference is that in the jargon of the art of power converters, the duty-cycle is defined differently. In the buck converter, the duty-cycle defines the conduction time of the buck switch, which is in the main power flow. The comparable element in the boost converter is the boost rectifier. In the boost converter, the duty-cycle defines the conduction time of the boost switch, which is in the by-pass current flow. The comparable element in the buck converter is the catch rectifier. There is a nominal inverse relationship so that the formulae for boost converters usually have the term (1-D).

An important difference is that the buck converter is current driven by the inductor current. The input current is the duty-cycle times the inductor current, $D_x * I_L$. Small errors in the duty-cycle result in small errors in the input current. In the boost converter, the duty-cycle determines the average voltage on the switch end of the input inductor, which should nominally equal the input voltage. Small errors in the duty-cycle can result in very large errors in the input current if the error voltage persists for any substantial time at all. Accordingly, the duty-cycle must be adjusted to correct errors in the input current.

In the pfc 3-phase buck converter of this invention, as illustrated in FIGS. 1, 8, 9 and 10, the non-dominant phase switches must be mutually exclusive, yet one or the other should be on when the dominant phase switch is on. In the pfc 3-phase boost converter of this invention, as illustrated in FIGS. 13 and 15, no such constraint exists. In fact, there will be overlap or a gap between the on times of the switches as the input currents are corrected under feedback control.

Figure 16:
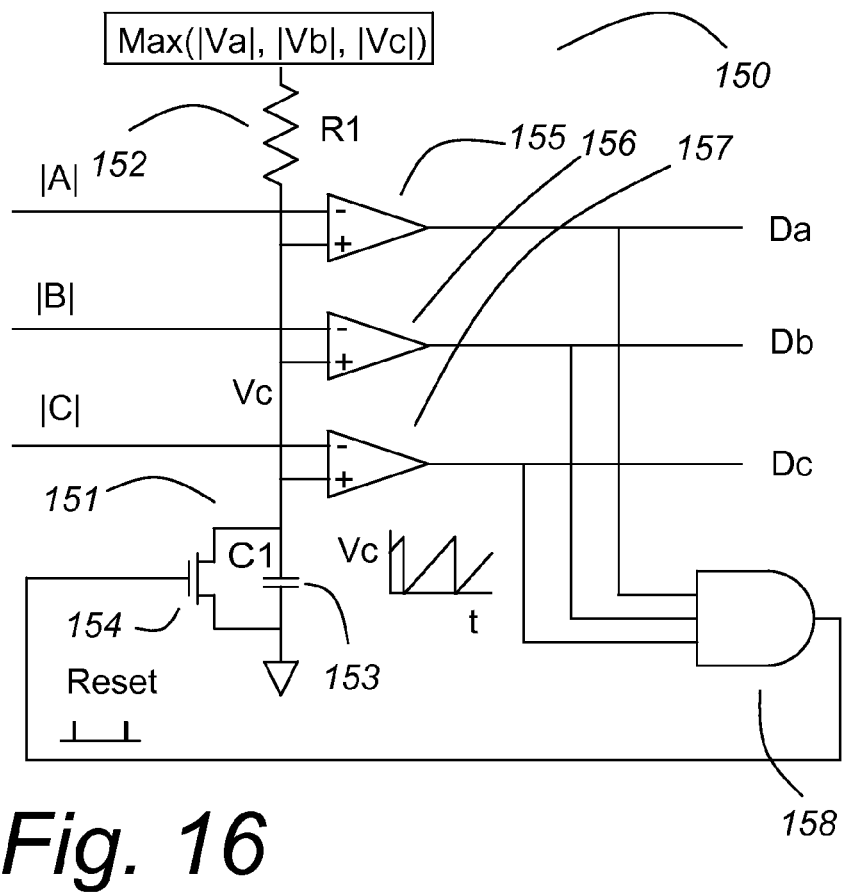
FIG. 16 shows a partial schematic to introduce a control method for the 0% duty-cycle pfc ac-dc boost converter of this invention.

FIG. 16 shows the basic elements of a control circuit 150 for a pfc 3-phase boost converter. The similarity to the control circuit 80 of FIG. 11 is noted, but with a caveat—this circuit is introductory but incomplete for a working circuit, not having current control modulation, a necessity. An integrator 151 has a capacitor 153 and charging resistor 152. The change from the control circuit 80 of FIG. 11 is that the comparators 155-157 are inverted so that they start their respective timing cycles in the low state. An AND gate 158 senses when the last comparator 155, 156 or 157 goes high and resets the integrator by turning on a MOSFET 154 momentarily. The basic control circuit 150 can accurately set the nominal timing, but the ideal timing matches the average voltage on the switch side of the input inductor to the input voltage. With a voltage match, the current would never change, ideally, and even a slight error will, over time, result in very large errors in the current.

Figure 17:
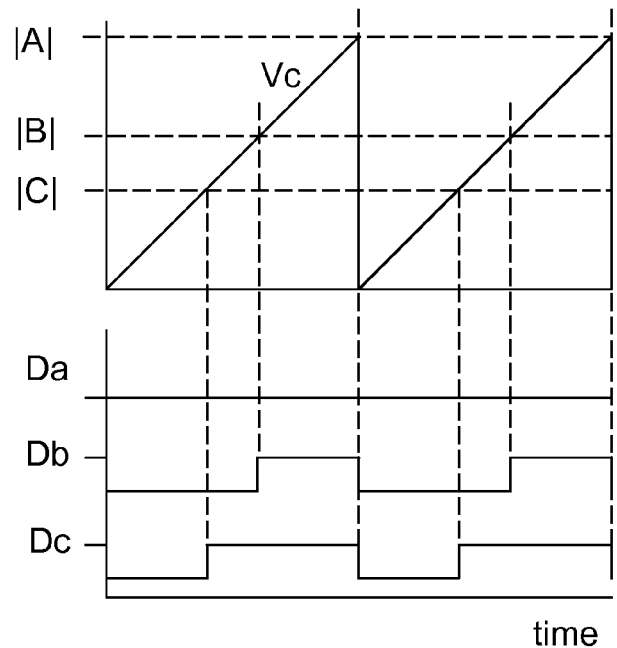
FIG. 17 shows the important curves for the control circuit of FIG. 16.

FIG. 17 shows the ideal timing. Note that the on-times of the non-dominant phases, Db and Dc overlap at the end of the cycle. The on time Dc of phase C is equal to the off time of Db, nominally, so the inverse of Db is preferred for the nominal phase C duty-cycle.

Figure 18:
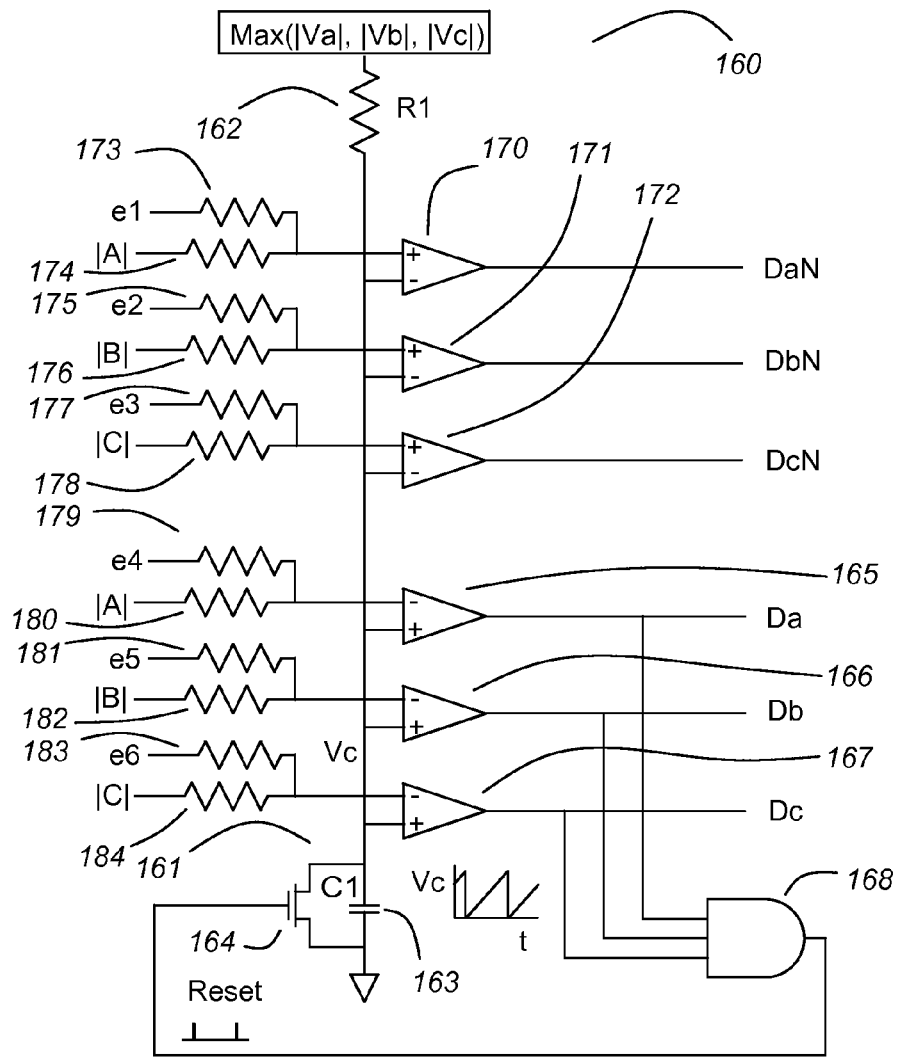
FIG. 18 shows a way of introducing a feedback error signal into the control of FIG. 16 as well as the preferred method of generating complementary duty-cycle signals.

FIG. 18 shows a control circuit 160 which is the control circuit 150 of FIG. 16, modified. A timing ramp Vc is generated by an integrator 161 having a capacitor 163 and a charging resistor 162. Three comparators 165-167 generate nominal duty-cycle signals Da, Db and Dc, and three more comparators 169-171 generate inverse signals DaN, DbN and DcN. 12 resistors 173-184 are on the inputs of the comparators 165-167 and 170-172 so that error signals e1-e6 can be summed in to modify the duty-cycles for current control.

Figure 19:
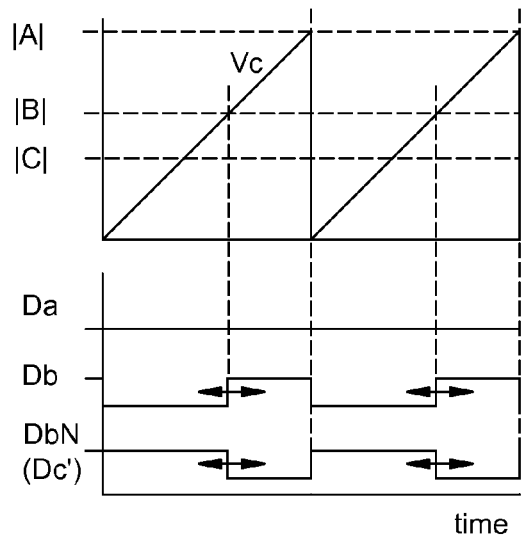
FIG. 19 shows selected curves for the control circuit of FIG. 18.

In FIG. 19, it can be seen that while phase A is dominant, the phase B duty-cycle is controlled by the comparator 166, generating the duty-cycle Db. As seen by the arrows in FIG. 19, the pulse width is modulated to control the phase B input current iB. The phase C duty-cycle is controlled by the comparator 170 as DbN, and its pulse width is also modulated to control the phase C input current iC.

For current control, the overlapped timing of FIG. 17 is alright. However, when both switches are on, no current flows to the boost capacitor and when both are off, the additive currents flow there. By using the control of FIG. 19, this doubling up is largely eliminated. In theory, the ripple current goes to zero at the times in the ac cycle when the non-dominant phase voltages are equal, a desirable condition, and it is reduced for most of the rest of the ac cycle.

The current control error signals can be generated in several ways. One is to measure the respective input currents and control each to match a current reference. Current measurement is complicated and may reduce efficiency, so the more simple method of comparing the transformer center-tap voltage Vct to the current vector reference voltage Vcvr is preferred for general use. The exact details of the current control are less important than the teaching that current control is necessary.

Ideally, when the voltage of any phase crosses zero, the current should be zero as well, and that condition can be forced by momentarily turning off the boost switch. This forces the boost stage into discontinuous conduction with a very high voltage if current flows at all, as it must forward bias its boost rectifier, and that requires a voltage somewhat greater than the voltage of the dominant phase, which is at its peak. Accordingly any remnant current will decay almost instantly to zero, after which the boost rectifiers are back biased and no additional current can flow. This limits the amount that the currents can drift.

No representation is made that the control circuits 80, 150 or 160 of FIGS. 11, 16 and 18, respectively, are complete—they are intended only to show fundamental principals and illustrate the basics of means for control. Given the formulae to be implemented and the examples shown in this specification, one skilled in the art of control circuits for power converters would be able to apply the teachings of this invention to make practical power converters without undue experimentation. Modern power converter controls are often digital controls, and a digital signal processor that implemented the control equations of this invention would be a good choice for many applications.

Figure 20:
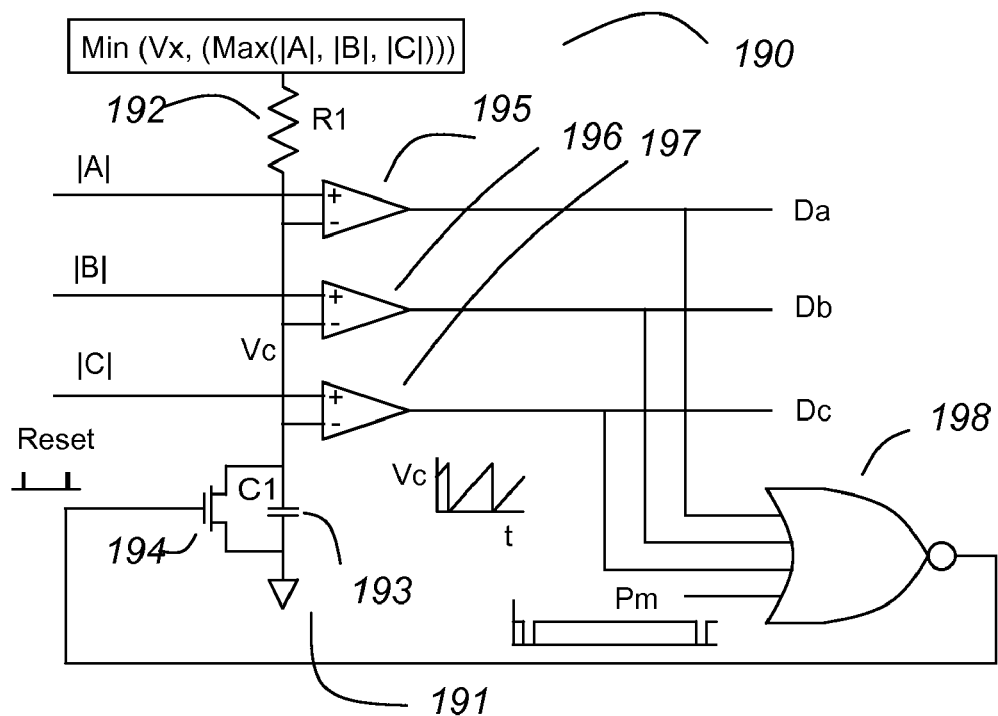
FIG. 20 shows a modification to the control of FIG. 16, to reduce the duty-cycle for over-voltage transients.

FIG. 20 shows a pfc 3-phase buck power converter control 190 that is a modification of the pfc 3-phase buck power converter control 80 of FIG. 11. The modifications are to enable the power converter to transition to a different mode of operation for over-voltage conditions in which the voltage is controlled by reducing the duty-cycles Da, Db and Dc. As in the control 80 of FIG. 11, an integrator 191 generates a reference ramp voltage Vc. The integrator 191 has a capacitor 193 and a charging resistor 192. Three comparators 195-197 are responsive, respectively, to input voltage signals |A|, |B| and |C|. The respective comparators 195, 196 or 197 go low when the reference ramp voltage Vc rises to equal respective input voltage signals |A|, |B| or |C|. A four input NOR gage 198 generates a reset pulse when all of the signals Da, Db and Dc go low, provided that the minimum pulse width signal Pm is also low, as it will be for normal operation. The minimum pulse width signal Pm may be generated by a retriggerable one-shot that is retriggered by the reset pulse, as an example, not a limitation. The reset pulse resets the reference ramp voltage Vc by momentarily turning on a MOSFET 194.

Figure 21:
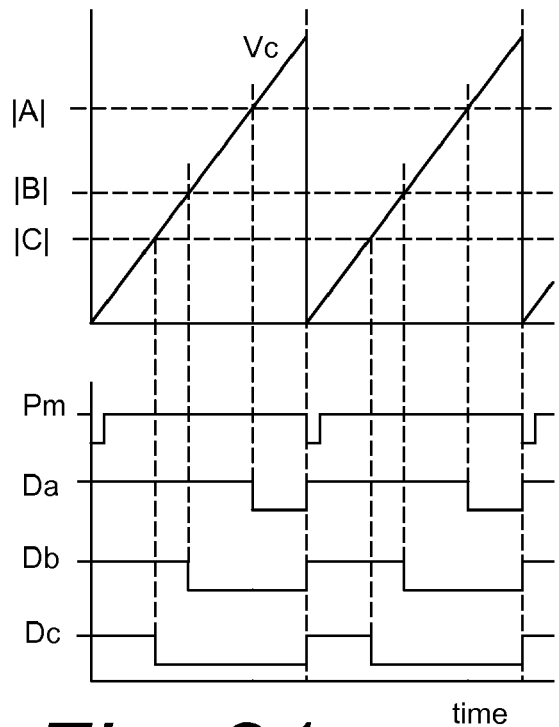
FIG. 21 shows the important curves for the control of FIG. 20.

FIG. 21 shows the important waveforms of the control circuit 190 of FIG. 20. Note in particular that the charging ramp Vc does not reset until the minimum pulse width signal Pm goes low.

Whereas the control 80 of FIG. 11 used a signal equal to Max (|A|, |B|, |C|) for the charging ramp source voltage, in the control 190 of FIG. 20, that signal is limited to a maximum value of Vx. Previously, as the input voltages went up, the charging ramp source voltage increased proportionally to keep the charging time to trip approximately the same regardless of the input voltage. In the modified control circuit 190 of FIG. 20, if the input voltage exceeds Vx, the charging ramp source voltage is clamped, and the trip time decreases as the voltage increases further, a condition that is used to reduce the respective duty-cycles Da, Db and Dc. However, unmodified, the reset pulse is generated when the last signal Da, Db or Dc goes low and the duty-cycle is not reduced, the frequency just would increase. This problem is resolved using the minimum pulse width signal Pm which prevents premature reset. The frequency remains constant and the duty-cycle reduces as the input voltage goes further into over-voltage.

Just as the 100% duty-cycle buck converter can transition to a lower duty-cycle, the 0% duty-cycle boost converter can transition to a higher duty-cycle for under-voltage conditions. The transition is not as simple, however, due to the non-linearity of the boost equations. For the special case of the 0% duty-cycle, an inconvenient multiplier for the output voltage for the dominant phase is greatly simplified. In a boost converter, the output voltage is given by $$Vo = \frac{Vi}{1-D}$$

If D=0, then Vo=Vi. With the duty-cycle of the dominant phase being zero, the equations for duty-cycles of the other two phases are fairly simple equations (for the phase angle 60°<X<120°):

$$Da = 0$$
$$Db = \frac{B}{A}$$
$$Dc = \frac{C}{A}$$

The term A in the above equations is the voltage on the boost capacitor, and it equals the input voltage A only because the duty-cycle is zero. For other duty-cycles, the term becomes A/(1−Da). For the case where phase A is dominant and the duty-cycle Da of phase a is greater than zero, the equations become (for the phase angle 60°<X<120°):

$$Da > 0$$
$$Db = \frac{B}{A}(1-Da)$$
$$Dc = \frac{C}{A}(1-Da)$$

If Da is small, the error is not great. Even if Da is larger, the current control feedback will force control, so it is a viable mode of operation none-the-less as long as there is sufficient gain in the current modulation error signals, e1-e6 in FIG. 18.

Usually the boost converter is helpless in managing over-voltage conditions, but the 0% duty-cycle pfc 3-phase boost converter of this invention has an interesting alternate mode that is helpful for larger over-voltage conditions: turn off the boost switches, that is, make the duty-cycle of all three phases equal to zero. Pfc will be lost, but the voltage across the boost capacitors is reduced from 2 (max(|A|, |B|, |C|)) to max (|A−B|, |B−C|, |C−A|), that is, the maximum line to line voltage. For the example of a 120/208 3-phase input, that it a reduction from 339.4 V peak to 294.2 V peak. A small difference, but potentially useful if the input voltage is more than 15% over nominal.

Figure 22:
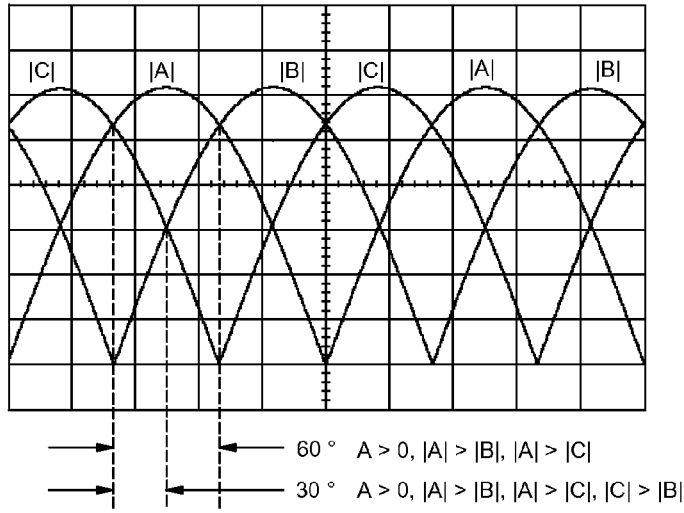
FIG. 22 shows full-wave rectified voltage waveforms for the three phase voltages of 3-phase ac, for reference in the discussion of control methods. Note the representative 60° and 30° increments, portions of the 360° line frequency cycle.

FIG. 22 shows a graph of three signals, |A|, |B| and |C| that represent, respectively, the magnitudes of the 3-phase input voltages A, B and C. For use in control circuits, the signals are preferably buffered and scaled to a low value, as would be well understood by one skilled in the art of control circuits. The graph shows one complete cycle of the line frequency input voltages, commonly referred to as 360 electrical degrees, or 360°. It can be seen that each of the voltages |A|, |B| and |C| has the highest magnitude twice during the cycle, each for 60°. In FIG. 20, the first instance of |A| having the highest magnitude is designated. It is also a time during which A is positive, or A>0.

The time period that A has the highest magnitude and is positive can further be divided into time periods, each of 30°, the first with |C|>|B| and the other with |B|>|C|. Thus 12 comparable time periods can be defined for control purposes.

Figure 23:
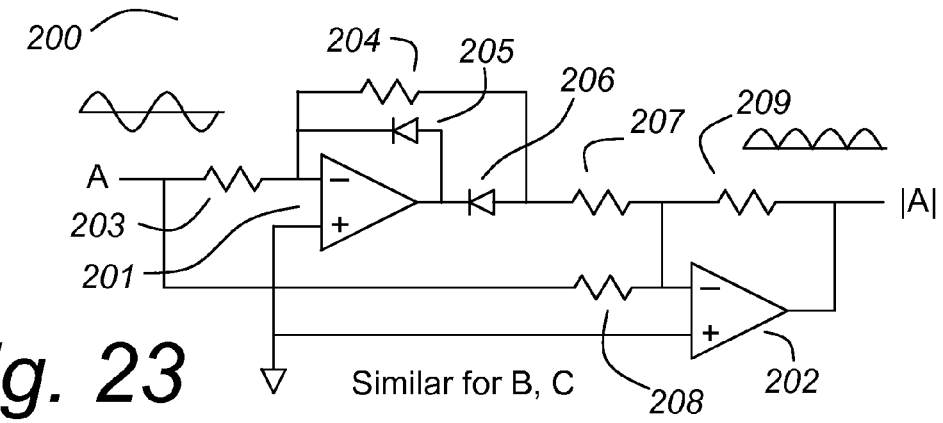
FIGS. 23 through 25 show representative analog and analog-digital control elements, all well known, for reference in the discussion of control methods.

FIG. 23 shows a circuit for generating a precise full-wave rectified signal |A|, which could also be identified as the "magnitude" or "absolute value". This is a common "text book" circuit, very familiar to one skilled in the art of analog design. A first operational amplifier 201 provides an output voltage determined by the input A and the scaling resistors 203 and 204. However, clamp diodes 205 and 206 restrict the output to be negative or zero. The output of the first operational amplifier 201 is scaled two to one in a second operational amplifier 202 and, if it is negative, it dominates the output. If it is zero, the signal A determines the output. The resistors 207-209 determine the scaling of the second operational amplifier 202.

Figure 24:
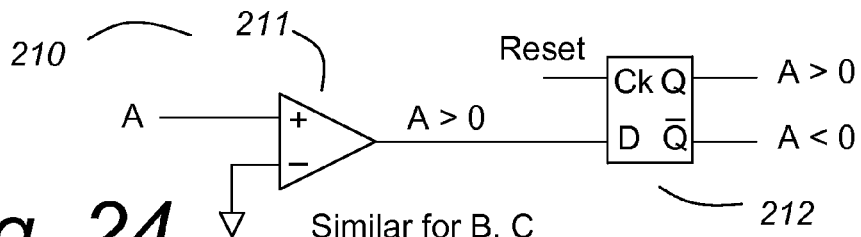
Figure 25:
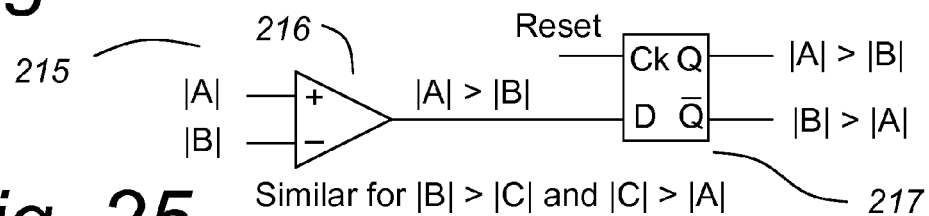

FIG. 24 shows that a comparator 210 can determine if A>0. A "D" flip-flop 212 latches this information from reset pulse to reset pulse so that it cannot change or jitter during a switching cycle. Similarly, in FIG. 25 a comparator 216 determines if |A|>|B|, and similarly a "D" flip-flop 217 latches the information for the duration of the switching cycle. Similar circuits determine the other relationships necessary for identifying time periods for control, with reference to FIG. 22. No novelty is claimed for these circuits, but they illustrate examples, not limitations, of means for controlling the pfc 3-phase buck and boost converters of this invention.

It should be noted that the signals used in the control of FIG. 18 are absolute value and the timing conditions are repeated twice for each cycle of the line frequency ac voltage. The voltages and currents are in fact alternating, however, so a signal that is right for a positive half cycle may be wrong for the negative half cycle. In particular, be careful that the error signals e1-e6 are the correct polarity. It may be necessary to switch their polarity as the voltages go through zero. It is contemplated that comparators and logic gates will be used to define the 12 time periods identified in the discussion of FIG. 22, to route the appropriate duty-cycle pulses to the switches and to ensure that the error logic is applied correctly. In as much as analog switches are relative complicated and expensive compared to comparators and logic gates, a preferred design may have comparators set up for all possible conditions with the best output selected in digital logic for application at any instant in time. Alternatively, digital signal processors (dsp) are being used increasingly in power converter controls. With an a-d converter for each analog input, all else can be sorted out in the dsp programming.

FIGS. 1, 8, 9 and 10 show pfc 3-phase 100% duty-cycle buck converts of this invention, and all show a variable dc-dc transformer as a modulator. While using a variable dc-dc transformer is a preferred embodiment of the invention, it is not necessary to use it. If dielectric isolation and voltage shifting are not needed, the output of the inductor can be taken to any power modulator that can be modulated to control the output voltage as a dc voltage. Because the buck stage can operate at reduced duty-cycle to accommodate over-voltage conditions but is saturated for under-voltage conditions, it is preferred that the output modulator either have boost characteristics or that it have sufficient linear range to control for under-voltage.

Figure 26:
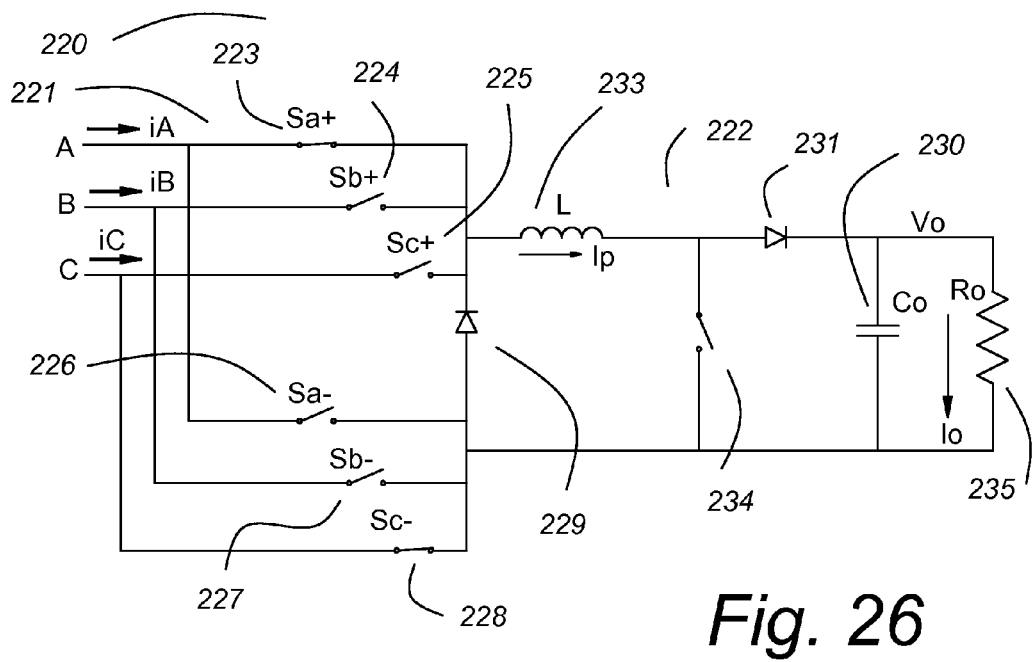
FIG. 26 shows a simple 100% duty-cycle 3-phase pfc ac-dc buck converter of this invention, useful where isolation and voltage shifting are not needed.

FIG. 26 shows a 100% duty-cycle pfc 3-phase ac-dc power converter 220 having a buck input stage 221 and a boost output stage 222. Six buck switches 223-228 operate similarly to the six buck switches 44-49 of FIGS. 8 and 9 and control the average voltage on the input of an inductor 233. During normal operation, the one of the switches 223-228 associated with the dominant phase A, B or C has 100% duty-cycle, and the duty-cycles of the non-dominant phases total 100%. For over-voltage operation, the duty-cycles may be reduced in proportion, and if all of the switches are open, a catch rectifier 229 conducts the current Ip of the inductor 223. For normal and under-voltage conditions, when the buck stage 221 is operated at 100% duty-cycle, a boost switch 234 modulates to precisely control an output voltage Vo. A boost rectifier 231 and an output capacitor 230 complete the boost converter 223 and provides a current Io to a load, shown, as an illustration, not a limitation, as a resistor 235.

Alternatively, a fixed transformer can be used for dielectric isolation and/or voltage shifting followed by any power modulator. As an example, not a limitation, the power converters use in FIGS. 1, 8, 9 and 10 could use a fixed ratio dc-dc transformer followed by a boost switch to ground, a boost rectifier and an output capacitor to make a boost converter output stage. In such a configuration, it may be preferred to have the inductor on the secondary side, as in FIG. 10, but in theory this is not necessary as the inductor would reflect through the transformer to the secondary side if it is on the primary side.

Figure 27:
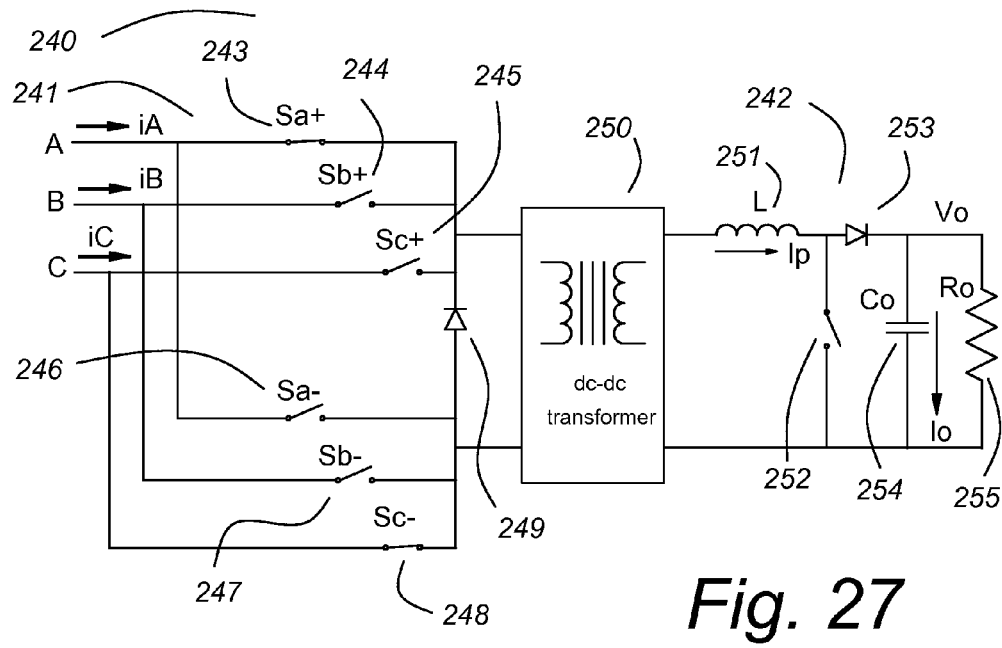
FIG. 27 shows a simple 100% duty-cycle 3-phase pfc ac-dc buck converter of this invention having a dc-dc transformer for isolation and voltage shifting.

FIG. 27 shows a 100% duty-cycle pfc 3-phase ac-dc power converter 240 having a buck input stage 241, a fixed ratio dc-dc transformer 250 and a boost output stage 242. Six buck switches 243-248 operate similarly to the six buck switches 44-49 of FIGS. 8 and 9 and control the average voltage on the input of the dc-dc transformer 250. The output of the dc-dc transformer 250 goes to an inductor 251. During normal operation, the one of the switches 243-248 associated with the dominant phase A, B or C has 100% duty-cycle, and the duty-cycles of the non-dominant phases total 100%. For over-voltage operation, the duty-cycles may be reduced in proportion, and if all of the switches are open, a catch rectifier 249 conducts the current Ip of the inductor 251 as reflected through the dc-dc transformer 250. (In practice, the secondary rectifiers of the dc-dc transformer may do this function as well or better). For normal and under-voltage conditions, when the buck stage 241 is operated at 100% duty-cycle, a boost switch 252 modulates to precisely control an output voltage Vo. A boost rectifier 253 and an output capacitor 2254 complete the boost converter 242 and provides a current Io to a load, shown, as an illustration, not a limitation, as a resistor 255.

However, the pfc 3-phase 0% duty-cycle boost converter cannot be made without a transformer, as an essential part of its operation is the mirrored voltage on the boost capacitors due to the coupling through the primary winding of the transformer. The transformer can, however, be a fixed ratio transformer provided that there is an output power modulator that can control the output voltage to be a dc voltage. A fixed dc-dc transformer operating at 100% duty-cycle could be followed by a buck converter, as an example, not a limitation. The primary excitation can be pulse width modulated (pwm) in the usual manner of transformer coupled buck converters, as another example, not a limitation. The variable ratio dc-dc transformer is preferred as it is anticipated that it will be more efficient and generate lower ripple voltages and currents, but it is not essential for the use of the invention.

A variable dc-dc transformer has limited useful range, particularly when reducing the output voltage, so an optimum design may use the variability of the variable dc-dc transformers for control for smaller errors about the nominal input voltage and it may transition to pwm operation for larger over-voltage conditions, as an example, not a limitation. Alternatively, the output synchronous rectifiers may pwm to form a buck converter with the output inductor, as an example, not a limitation.

Figure 28:
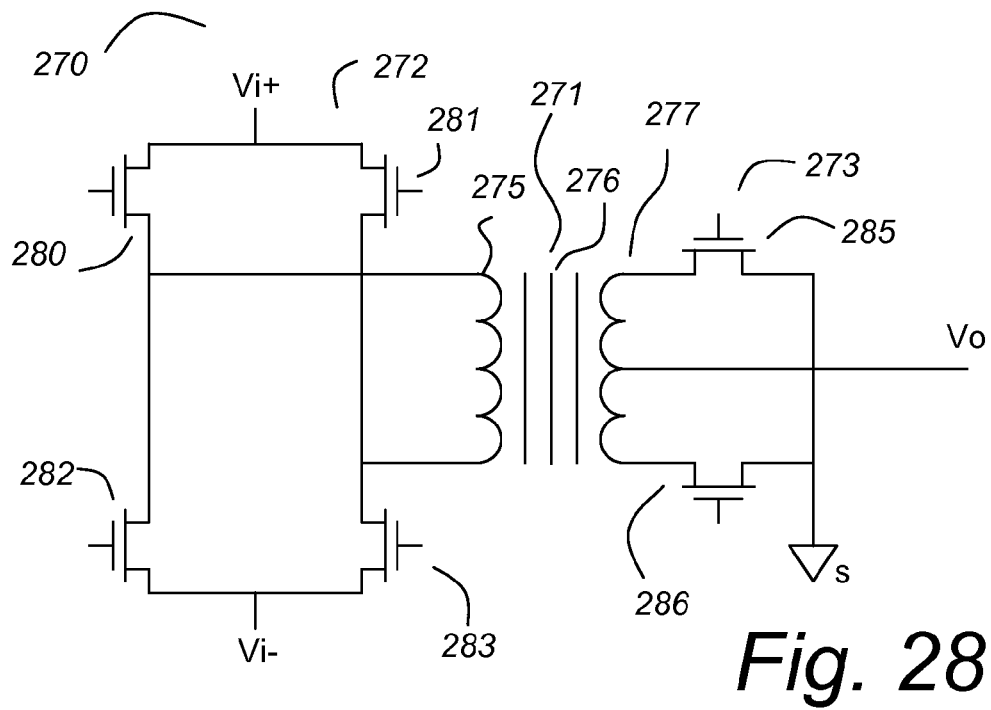
FIG. 28 shows a dc-dc transformer.

FIG. 28 shows a representative dc-dc transformer 270. The dc-dc transformer 270 is a high frequency transformer 271 together with a primary switching circuit 272 and a secondary rectifying circuit 273, the whole dc-dc transformer thus being able to accept a dc input voltage Vi+ and Vi− and output another dc voltage Vo with voltage shifting and dielectric isolation. Dc-dc transformers are well known. The dc-dc transformer 270 is included here to illustrate an essential component of the ac-dc power converters of this invention, such as the 100% duty-cycle pfc 3-phase ac-dc buck power converter 240 of FIG. 27.

In FIG. 28, primary switches 280-283 (shown as MOSFETs as an illustration, not a limitation) are configured in the familiar full-bridge arrangement and provide alternating excitation to a primary winding 275 of the transformer 271. The alternating excitation in the primary winding 275 induces flux changes in a transformer core 276 and thus induced an ac voltage in a secondary winding 277 of the transformer 271. Synchronous rectifiers 285 and 286 (shown as MOSFETs as an illustration, not a limitation) are configured in the familiar push-pull arrangement to rectify the ac voltage of the secondary winding 277 to produce a dc voltage Vo on the output.

Many other arrangements of the primary switching circuit 272, the transformer windings 275 and 277 and the secondary rectifying circuit 273 are known and are suitable alternatives to the dc-dc transformer 270 of FIG. 28.

Figure 29:
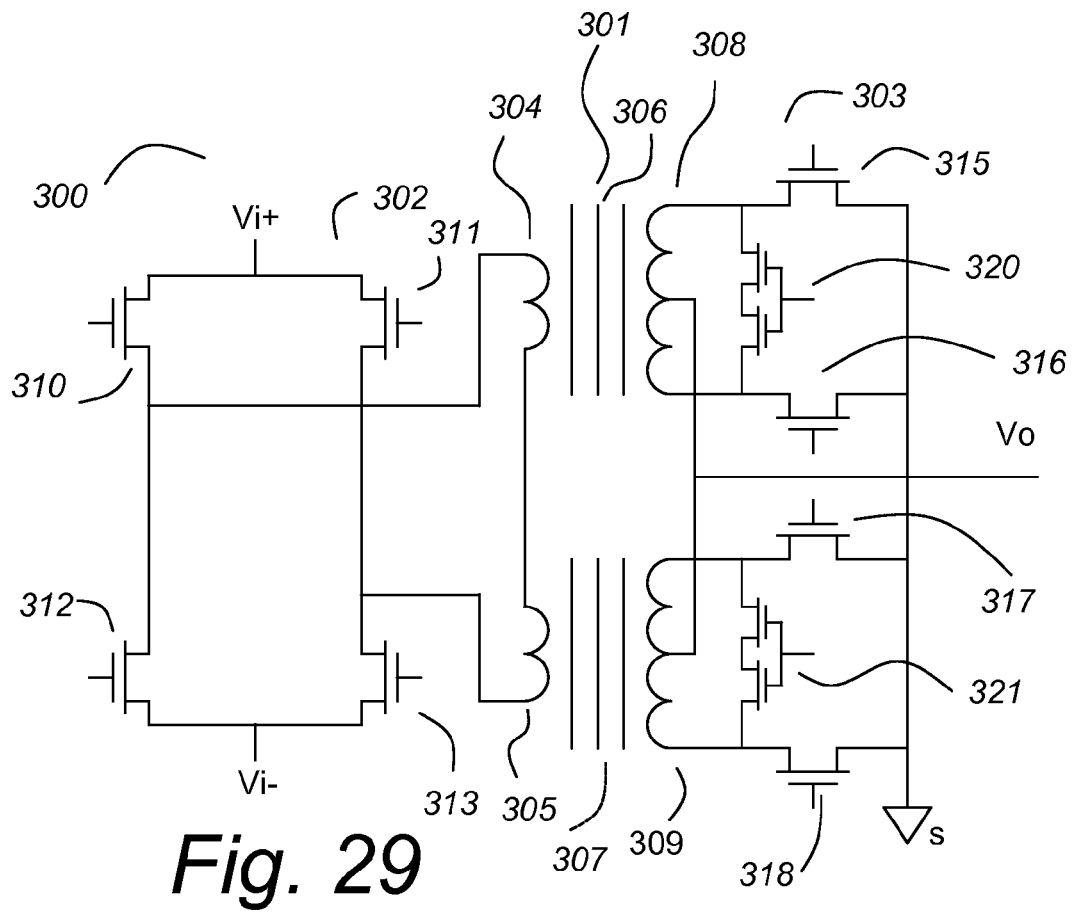
FIG. 29 shows a variable dc-dc transformer.

FIG. 29 shows a very simple variable dc-dc transformer 300. The variable dc-dc transformer 300 has a multi-core transformer 301, a primary switching circuit 302 and secondary rectifying circuit 303. The multi-core transformer 301 has a first section with a primary winding 304, a magnetic core 306 and a secondary winding 308 and a second section having a primary winding 305, a magnetic core 307 and a secondary winding 309. The primary switching circuit 302 is arranged as a full-wave bridge with switches 310-313 (shown as MOSFETs as an illustration, not a limitation) to provide an alternating excitation to the primary windings 304 and 305, connected in series. The primary windings 304 and 305 excite, respectively, the magnetic cores 306 and 307 to induce ac voltages in the respective secondary windings 308 and 309.

Synchronous rectifiers, 315-318 (shown as MOSFETs as an illustration, not a limitation) rectify the ac voltages in the secondary windings 304 and 305 to provide a dc output voltage Vo.

The turns-ratios of the windings, primary winding 304 to secondary winding 308 and primary winding 305 to secondary winding 309 may or may not be the same, but regardless, the voltage across the secondary windings 308 and 309 is constrained to be the same as the outputs are wired in parallel. As would be well understood by one skilled in the art of transformers, the respective secondary voltages reflect to the primary windings 304 and 305 as their respective turns-ratios, where they add because the primary windings 304 and 305 are in series (assuming correct phasing of the windings).

Each of the secondary windings 307 and 308 has, respectively, a shorting switch 320 and 321 (shown as an illustration, not a limitation, as back to back MOSFETs). To vary the turns-ratio of the variable dc-dc transformer 300, one set of synchronous rectifiers, 315 and 316 or 317 and 318 are turned off and the respective shorting switch 320 or 321 is turned on. For discussion purposes as an illustration, we will assume that the synchronous rectifiers 315 and 316 are both turned off and the shorting switch 316 is turned on. This causes a short circuit to be reflected to the primary winding 304, and it is as if the transformer core 306 and its windings were "removed" from the variable dc-dc transformer, effectively changing its effective turns-ratio.

In the variable dc-dc transformer 300 of FIG. 29, the ratio changes in discrete steps, depending upon whether a transformer section is operable or "removed". It may have three turns-ratios, if the transformer sections have different ratios, as follows. 1. No section "removed". 2. The first section "removed", in which case the effective turns-ratio is the turns-ratio of the second section. 3. The second section "removed", in which case the effective turns-ratio is the turns-ratio of the first section. A possible fourth state, with both sections "removed" is possible and can be used if the primary power source is current driven or current limited. In other designs, there may be a greater number of sections that can be "removed", so there can be a greater number of fixed steps. Because the steps are controlled by electronic switches, the turns-ratio can be changed rapidly and it can modulate between steps to have any intermediate average effective turns-ratio.

More information on variable transformers is provided in a tutorial "Design and Application of Matrix Transformers and Symmetrical Converters", a seminar given by Edward Herbert at the Fifth International High Frequency Power Conversion Conference '90, in Santa Clara, Calif., May 11, 1990.

A new configuration of a variable dc-dc transformer is taught in Ser. No. 11/423,957. That design is shown, in part, in FIG. 29.

The variable dc-dc transformer is an effective modulator. An ideal transformer has no losses, and the power in equals the power out. In the variable dc-dc transformer, the effective turns-ratio is changed in steps by digital switching, and the effective turns-ratio can be infinitely varied, on average, by pulse-width-modulating between steps.

The excitation of the variable dc-dc transformer is switched at 100% duty-cycle (50-50%, no off time) to maximize its efficiency. With reference to FIG. 1, the input voltage Vs of the variable dc-dc transformer 9 (the voltage at the output of the inductor 2) is determined as the output voltage Vo reflected to the primary by the inverse of the turns-ratio. The voltage Vs steps in response to step changes in the effective turns-ratio, but the steps are far smaller than the voltage steps in a boost converter.

In a boost converter, the inductor voltage switches between 0 volts and the output voltage Vo. When a variable dc-dc transformer is used with an inductor on its input and a capacitor on its output, the voltage across the inductor has a much smaller variation, so the inductance can be much smaller.

Like a boost converter with 0 duty-cycle (the switch always off), the variable dc-dc transformer has its maximum efficiency when its effective turns-ratio is maximum. For lower input voltage, one or more sections of the transformer are modulated, so only a portion of the through current is affected, keeping efficiency high and causing much less noise (ripple, emi) than a buck, boost or other pwm topology.

The variable dc-dc transformer does not depend on ramping up or ramping down the current in an inductor to change its output voltage and current, so its bandwidth and dynamic response are very good. The underlying switching frequency of the dc-dc transformer does not affect the dynamic response at all (as long as the notches are small), so the transformer switching frequency can be optimized for maximum efficiency.

The variable dc-dc transformer may use a coaxial transformer, for its simple construction and extremely low leakage inductance. Simple variable dc-dc transformers may use as few as two transformer sections, and the sections may be ordinary transformers, such as planar transformers in a circuit board, as an example, not a limitation.

Figure 30:
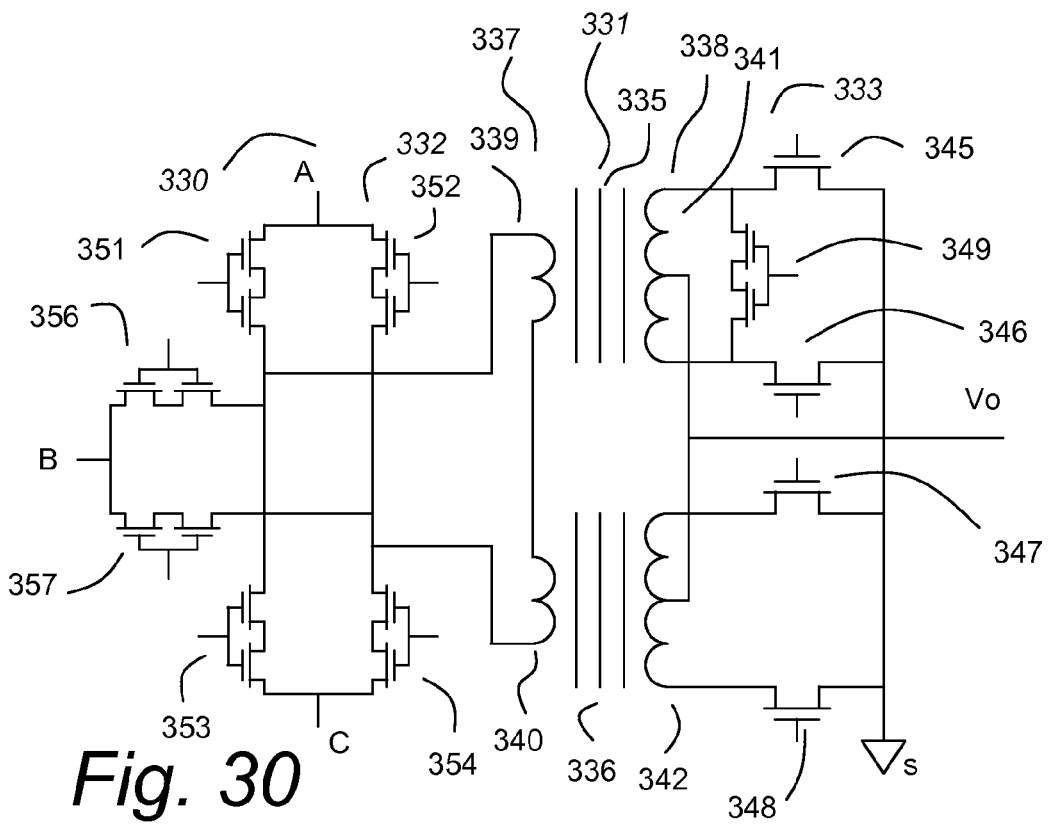
FIG. 30 shows a variable ac-dc transformer.

FIG. 30 shows a variable ac-dc transformer 330 having a primary switching circuit 332, a multi-core transformer 331 and a secondary rectifying circuit 333. The multi-core transformer 331 has a first section with a primary winding 339, a magnetic core 335 and a secondary winding 341 and a second section having a primary winding 340, a magnetic core 336 and a secondary winding 342. With reference to FIG. 10, FIG. 30 includes both an example of the primary switching circuit 61 and the variable ac-dc transformer 70. With reference to FIG. 2, the polarities of the input voltages A, B and C will change throughout the ac line frequency cycle, but relative to the switching frequency, the change is very slow. Therefore, to discuss the operation of the variable ratio ac-dc transformer 330, we can pick an operating point and describe the input voltages A, B and C as if they were dc voltages. At 30°, A is positive, B is zero and C is negative. For this instant, primary switches 351, 352, 353 and 354 operate exactly as a dc full wave bridge, and primary switches 356 and 357 are not operated.

At 90°, A is positive at its maximum value, and B and C are both negative and are the same value. The switches 351 and 352 associated with A will alternate being turned on at a 50-50 duty-cycle, just as the switches in a dc bridge circuit. While the switch 351 is on, first the switch 357 will turn on, then it will turn off and the switch 354 will turn on. Precisely at 90°, they will have equal on times, 25-25 duty-cycle relative to the 50% duty-cycle of the switch 351. Then the switches 351 and 357 will turn off, and the switches 352 and 356 will turn on. Again, while the switch 352 remains on, the switch 356 will turn off and the switch 353 will turn on. At the end of the switching frequency cycle, the switches 352 and 353 will both turn off and the switches 351 and 357 will turn on, starting the next switching frequency cycle.

Because the switches 351-357 are ac switches (that is, they will block voltage of either polarity when turned off), the phase voltages A, B and C can be positive or negative, as they will be in equal measure throughout the ac line frequency cycle. At any instant, the switches which are associated with the dominant phase, be it positive or negative, will switch at 50-50 duty-cycle, and the switches associated with the non-dominant phases will switch each in turn in the pattern described and according to the duty-cycle equations. In this manner, the correct alternating ac excitation is provided on the primary windings 339 and 340 to excite the respective magnetic cores 335 and 336 so as to induce an ac voltage in the respective secondary windings 341 and 342. Synchronous rectifiers 345-348 convert the ac voltage in the respective secondary windings 341 and 342 to a dc output voltage Vo. As the ac input voltages change polarity, care must be taken to synchronize the switching of the synchronous rectifiers 345-348 so that the output voltage Vo is the correct polarity at every instant.

A shorting switch 349 can be used to "remove" the first section in the manner described in the discussion of FIG. 29. Note, though, that only one of two transformer sections is so equipped, so the transformer has two states. As an example, not a limitation, the first transformer section may have a turns-ratio of 3 to 1 and the second transformer section may have a turns-ratio of 7 to 1, for a net effective turns-ratio of 10 to 1, changeable to 7 to 1. Any average effective turns-ratio between 7 to 1 and 10 to 1 can be synthesized through modulating between the states.

As an example, not a limitation, if it were desired to have a transformer that would accept a nominal 85 V dc input and produce a precision 10 V dc output, the transformer would operate with a nominal 8.5 to 1 turns-ratio. Precise voltage regulation can be maintained for an input voltage range of 70 to 100 V dc, or 85±15 V dc. A ripple voltage such as the ripple voltage Vs of FIG. 7 plus some variation in the line voltage can thus be accommodated and provide a precise constant dc output voltage.

From one switching frequency cycle to the next, the change in the phase voltages is very small, and whatever small change there is in the duty-cycles assures equal average negative and positive applied voltage as described above. Because the phase voltages A, B and C are applied with very nearly equal duty-cycles but opposite polarity in successive half cycles of the switching frequency, this ensures equal positive and negative excitation in successive halves of the switching frequency cycle, for equal flux swing. While it is always good design practice to be alert to errors that could cause flux walking, there is no more of a problem with a 3-phase input, switched in accordance with the duty-cycles of this invention, than there is with a dc input.

Figure 31:
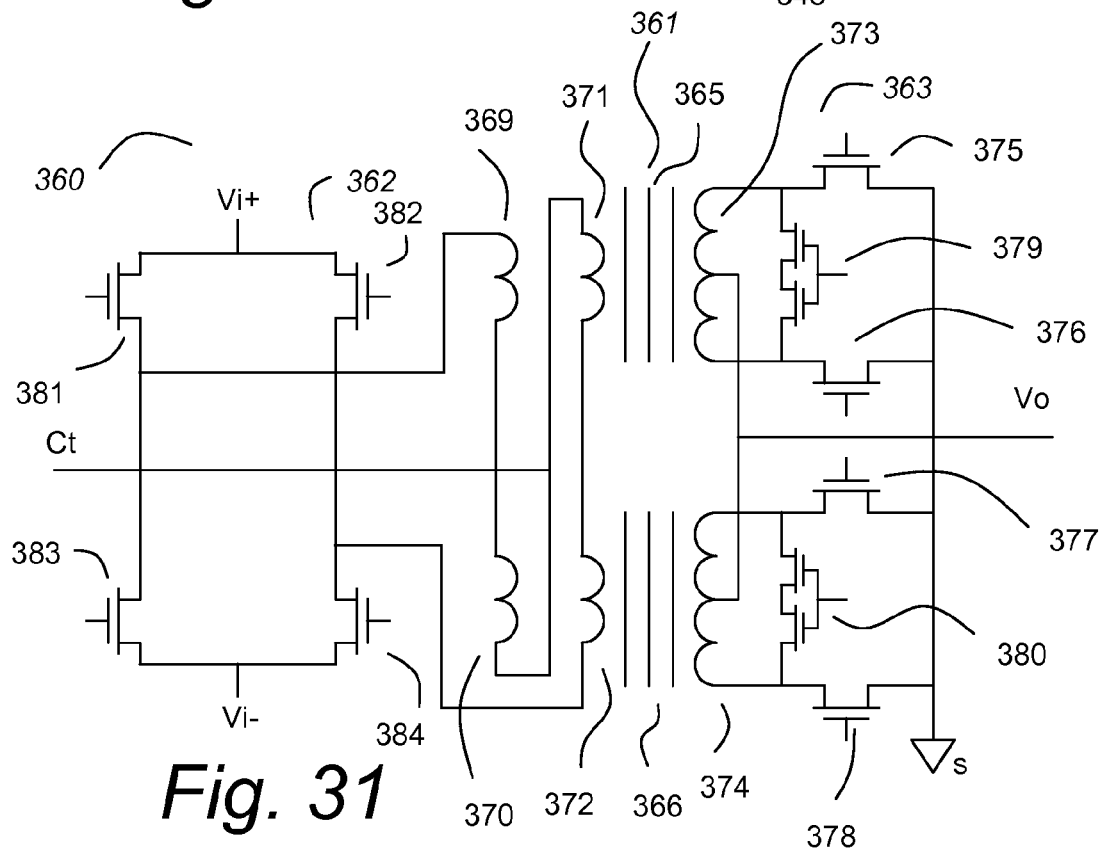
FIG. 31 shows a variable dc-dc transformer having a center-tap on its input.

FIG. 31 shows a dc-dc variable transformer 360 that is suitable as the dc-dc variable transformer 120 of FIGS. 13 and 15, in that it has a center-tap input Ct as well as positive and negative inputs Vi+ and Vi− respectively. The variable dc-dc transformer 360 has a multi-core transformer 361, a primary switching circuit 362 and secondary rectifying circuit 363. The multi-core transformer has a first section with primary windings 369 and 371, a magnetic core 365 and a secondary winding 373 and a second section having primary windings 370 and 372, a magnetic core 366 and a secondary winding 374. The primary switching circuit 362 provides alternating excitation to excite the respective primary windings 369, 371, 370 and 372 of the multi-core transformer 361 so as to induce flux changes in the respective magnetic cores 365 and 366 that will induce ac voltages in the respective secondary windings 373 and 374. Synchronous rectifiers 375-378 rectify the respective ac voltages in the respective secondary windings 373 and 374 to make a dc output voltage Vo.

Shorting switches 379 and 377 operate in the same manner as in the variable dc-dc transformer 300 of FIG. 29 to change the effective turns-ratio of the variable dc-dc transformer 360. Note, to have an effective center-tap connection Ct, the primary windings above and below the center-tap must be the same and must have the same excitation for all operating modes. That is, the primary windings 369 and 370 in series must have the same turns, respectively, as the primary windings 371 and 372, and they must, respectively, have the same excitation. Stated differently, the terminal voltage of the series primaries 369 and 370 must always equal the terminal voltage of the series primaries 371 and 372 for any mode of operation.

In FIGS. 13 and 15 the boost switch input stage 101 and the variable dc-dc transformer 120 of the 0% duty-cycle pfc 3-phase ac-dc boost converter 100 are both boosting stages, though the variable dc-dc transformer 120 can be made to have buck characteristics over a limited range by designing it to have reduced equivalent turns-ratio at nominal input conditions. As the effective turns-ratio is increased, the output voltage goes down, until the effective turns-ratio reaches its maximum.

The nominal adjustment range of the variable dc-dc transformer 120 is chosen such that all voltage variations within the normal input voltage range can be controlled by adjusting its effective turns-ratio, as that is the most efficient mode of control. For over-voltage transients, the primary switches (381-384 of FIG. 31) of the variable dc-dc transformer 120 may be pulse-width-modulated to control the output voltage, noting that in a complete power converter there will be a secondary side inductor such as the inductor 122 of FIGS. 13 and 15. This is a less efficient mode of operation, but it is used only during over-voltage transient conditions, which are brief.

Buck converters and boost converters are reciprocal circuits, so that they can be operated "backwards" if the switches are modified to accommodate reversed current flow or bi-directional current flow. According, dc to 3-phase ac circuits can be derived, and ac-ac converters can be made by co-joining an ac-dc converter with a dc-ac converter.

The pfc 3-phase ac-dc buck converter is a reciprocal circuit, if ac switches are used, so it can be operated "backwards" as a boost converter to generate a 3-phase voltage output of any frequency, including 0 Hz. The phase rotation can be reversed as well.

In FIG. 32, a dc-ac power converter 400 will be recognized as the reciprocal circuit of the 100% duty-cycle pfc ac-dc buck converter 40 of FIG. 8. A dc input voltage Vi may be filtered using an input capacitor 404 and is the input to a variable dc-dc transformer 401. The output of the variable dc-dc transformer goes to an inductor 403 and then to a quasi-boost switching stage 402 having six switches 405-410. Output filter capacitors 411-413 smooth the output voltages A, B and C.

The output switching circuit 402 with the inductor 403 will be recognized as a modified boost converter, except that it has "0% duty-cycle", as the inductor 403 is never shorted to ground. In fact, there isn't any switch to short the inductor 403. Instead, the duty-cycle is 100% to the output. One positive switch 405-407 and one negative switch 408-410 is always on, and the switch for the dominant phase is on continuously for the 60 degree phase interval that the phase is dominant. The duty-cycles of the non-dominant switches add to equal 100%, so one or the other is always on. A switch could be added corresponding to the catch rectifier 53 of FIG. 8 if it were desired to boost the output voltages, but that is not the anticipated method of controlling the output voltage and it would compromise the efficiency as the duty-cycle would no longer be 100% to the output. (The somewhat confusing jargon for "duty-cycle" is because duty-cycle is usually defined differently for buck converters and boost converters. The reciprocal circuit of a buck converter is a boost converter, and care must be used sorting out how duty-cycle is to be defined when making the translation.)

The small graphs indicate significant circuit parameters. In the case of the six graphs showing the duty-cycles of the switches, the graphs are labeled with the reference designator of the switch for which they are showing the duty-cycle. For example, at the start of the cycle, it can be seen that the duty-cycle for the switch 410 is 100% for the first 60° of the ac cycle. During the same interval, it can be seen that the duty-cycle of the switch 405 is increasing from 0 to 100% and the duty-cycle for the switch 406 is decreasing from 100 to 0%. The other switches remain off, that is, their duty-cycles are 0%. The duty-cycles are determined by "natural modulation", that is, they are forced by a fixed algorithm that has been optimized for efficient switching. The duty-cycles do not regulate the output voltage but the do force the output currents to be proportionately correct for a balanced 3-phase output.

The feedback control function 414 uses the relationship $Tx=\sqrt{Va^2+Vb^2+Vc^2}$ (scaling may be necessary) to ensure that the output is a good 3-phase sine wave of the correct voltage by controlling the ratio of the variable dc-dc transformer 401 as necessary to keep the function constant. The dc input Vi has good "power factor," in that the dc input current Ii does not vary or have any line frequency ripple (with constant balanced load, steady-state conditions).

The small graphs surrounding the drawing are copied and pasted from an average state SPICE simulation of the circuit, using the SPICE probe function. Note the resemblance of the duty-cycles to those shown in FIG. 9, further illustrating the reciprocal nature of the circuits. One difference is that the ac-dc converter has the waveform of the 3-phase ac input to use as a reference, whereas in the dc-ac converter the reference must be synthesized. How to synthesize a model 3-phase ac reference would be well known to one skilled in the art of analog design and digital signal processor applications.

This power converter is current driven, so it works best with a balanced load, and the reciprocal of the boost converter of FIG. 13 as shown in FIG. 33 may work better for some applications. The intent is not to go into details on a variety of reciprocal converter designs but to emphasize that these are reciprocal circuits and all can be used "backwards" with appropriate accommodation for the reversed current flow. In this specification and the claims a recitation of a power converter that transfers power in one direction includes its reciprocal.

FIG. 33 shows a dc to 3-phase buck power converter 500. It is the reciprocal of the circuit of FIG. 13. (There is a potential for confusion regarding "duty-cycle," because duty-cycle is usually defined differently for boost converters and buck converters. The reciprocal circuit of a boost converter is a buck converter, and care must be used sorting out how duty-cycle is to be defined when making the translation).

A dc input voltage Vi may be filtered with an input capacitor 504 and an inductor 503 and becomes the input to a variable dc-dc converter 501. The output of the variable dc-dc transformer is a push-pull output having voltages V+ and V– that are symmetrical with respect to the center-tap voltage Vct. The center-tap voltage Vct may be used as the secondary reference and as a neutral output connection, if desired.

The V+ and V– output voltages are taken respectively to positive and negative filter capacitors 507 and 506 and then to a secondary switching circuit 502 having nine switches 510 to 518. In this reciprocal circuit to the circuit of FIG. 13, the positive switches 510-512 occupy the place of the positive boost rectifiers 105-107, the negative switches 513-515 occupy the place of the negative boost rectifiers 108-109 and the switches 516-518 to Vct occupy the place of the boost switches 113-115. The switches must replace the rectifiers because of the reversed current flow and the need to use active switches in these places. In the boost converter of FIG. 13, the rectifiers are "switches", but they switch by virtue of being forward biased (on) or reversed biased (off). Output inductors 520-523 and output capacitors 524 to 526 smooth the 3-phase output voltages A, B and C.

The duty-cycles are determined by "natural modulation", that is, they are forced by a fixed algorithm that has been optimized for efficient switching. The duty-cycles do not regulate the output voltage but they do force the output voltages to be proportionately correct for a balanced 3-phase output. A feedback control circuit 530 senses the output voltages A, B and C. The square root of the sum of the squares will be a constant if the voltages A, B and C are correct and any error is used to vary the effective turns-ratio of the variable dc-dc converter to ensure regulation.

The small graphs are from an average state SPICE simulation and are copied and pasted using the SPICE probe function. For the switches, the graphs show the duty-cycle of the switch corresponding to its label. For example, at the start of the ac cycle and for the next 60° of the ac cycle the switch 515 has a duty-cycle of 100% (constantly on) for maximum efficiency. During the same period, the duty-cycle of the switch 510 increases from 0 to 100% duty-cycle, the duty-cycle of the switch 511 decreases from 100 to 0% duty-cycle.

The dc-ac output stage can be used with a 3-phase ac-dc buck converter input stage to make an ac-ac power converter, and the inductor is the common element linking the converters. The phase rotations and the frequencies of the input and output stages are not constrained, so the circuit can be used as a frequency converter. In the ac-ac converter, the inductor carries a dc current (with some triangular ripple, as in any buck or boost converter), and it can be powered from a dc power source, during power outages, to make a UPS.

The derivations so far have assumed that the 3-phase ac input voltage is solid, like commercial ac power, and the ac input voltages provide the sinusoidal references. This is not true for some power sources (windmills, turbines, regenerative braking, etc.), and for these (as well as in the dc-ac converter and the output stage of an ac-ac converter), a sinusoidal reference must be generated in the logic. The sinusoidal reference can plug into equations derived for natural modulation, and can control the phase angle of the current relative to the input voltage, for speed and torque control.

Following is a derivation of some of the functions that control the power converters of this invention that I have copied here for whatever value it has. It is a more rigorous development of the equations, but does not necessarily relate specifically to any of the figures or circuits disclosed in the specification. This specification describes power converters operating at 100% duty-cycle (buck converters) or 0% duty-cycle (boost converters) as they are novel. The derivation below starts with more general equations and not necessarily the same circuit, and builds from there.

In a generic buck converter:

$Ii=D*I_L \approx D*Io$ $Vo=D*Vi$

Three input buck converter, 3-phase ac, full wave rectified inputs:

$Ia=Da*I_L \approx Da*Io$ $Ib=Db*I_L \approx Db*Io$ $Ic = Dc * I_L \cong Dc * Io$ $Vo = Da*Va + Db*Vb + Dc*Vc$ Da, Db and Dc are mutually exclusive, that is, they must not overlap.

The above assumes positive dc voltages and currents. For pfc, the voltages and currents are full-wave-rectified sine waves:

$$\frac{Ia}{Va} = \frac{Ib}{Vb} = \frac{Ic}{Vc} = K$$

$Ia = K * Va$
$Ib = K * Vb$
$Ic = K * Vc$

Input power:

$Pi = Va*Ia + Vb*Ib + Vc*Ic$ $Pi = K*(Va^2 + Vb^2 + Vc^2)$ $Pi = K*Vp^2 * \{Sin^2 X + Sin^2(X+120) + Sin^2(X+240)\}$ $$Pi = \frac{3*K*Vp^2}{2}$$

Power flow (neglecting losses):

$Po = Pi$ $$Vo*Io = \frac{3*K*Vp^2}{2}$$

$$Io = \frac{3*K*Vp^2}{2*Vo}$$

Find the duty-cycles (sine envelope):

$Ia = K*Va = K*Vp*SinX = Da*Io$ $$Da = \frac{K*Vp*SinX}{Io}$$

$$Da = K*Vp*SinX \left[\frac{2*Vo}{3*K*Vp^2}\right]$$

$$Da = \frac{2*Vo}{3*Vp} * SinX$$

Similarly:

$$Db = \frac{2*Vo}{3*Vp} * Sin(X+120)$$

$$Dc = \frac{2*Vo}{3*Vp} * Sin(X+240)$$

The duty-cycle cannot be negative, but the magnitude is correct. A negative solution indicates that the input voltage for that phase is negative at that instant before being rectified.

Let $K = \frac{2*Vo}{3*Vp}$ $Da = K*\text{Sin } X$ $Db = K*Sin(X+120)$ $Dc = K*Sin(X+240)$ $Da + Db + Dc \leq 1$ With high-side and low-side switches:

$Da = K*\text{Sin } X$ $Db = K*Sin(X+120)$ $Dc = K*Sin(X+240)$

A negative duty-cycle is interpreted as being a positive value duty-cycle applied to a negative side switch.

For phase angle $60 < X < 120$ $Da \leq 1$ $Db + Dc = Da$

When one phase has the highest magnitude, the other two phases have the opposite polarity.

For maximum efficiency, as taught by this invention, $Dx = 1$

For phase angle $60 < X < 120$ $Da = K*SinX$

Let $K = \frac{1}{SinX}$ $Da = 1$ $$Db = K*Sin(X+120) = \frac{Sin(X+120)}{SinX} = \frac{Vb}{Va}$$

$$Dc = K*Sin(X+240) = \frac{Sin(X+240)}{SinX} = \frac{Vc}{Va}$$

The duty-cycles are the same for phase angles $240 < X < 300$, except the opposite polarity switches are used. For any phase angles, the relationships are similar, but one or another of phases A, B or C is maximum and has 100% duty-cycle ($Dx = 1$).

For any phase angle X, $$Da = \frac{SinX}{\max\{|SinX|, |Sin(X+120)|, |Sin(X+240)|\}}$$

$$Db = \frac{Sin(X+120)}{\max\{|SinX|, |Sin(X+120)|, |Sin(X+240)|\}}$$

$$Dc = \frac{Sin(X+240)}{\max\{|SinX|, |Sin(X+120)|, |Sin(X+240)|\}}$$

A negative duty-cycle is interpreted as being a positive value duty-cycle applied to a negative side switch.

Find the first stage output voltage Vo when the input buck converter is operated at 100% duty-cycle for maximum efficiency:

$$K = \frac{2*Vo}{3*Vp}$$

$$Vo = K * \frac{3*Vp}{2}$$

For phase angle $60 < X < 120$ $$K = \frac{1}{SinX}$$

-continued $$Vo = \frac{3*Vp}{2*\mathrm{Sin}X}$$

For any phase angle X, $$Vo = \frac{3*Vp}{2*\max\{|\mathrm{Sin}X|, |\mathrm{Sin}(X+120)|, |\mathrm{Sin}(X+240)|\}}$$

Power (energy flow):
For the output modulator stage, the power in equals the power out:

$$Px = Po$$
$$Vx*I_L = Vo*Io$$
$$I_L = \frac{Vo*Io}{Vx}$$
$$I_L = Vo*Io*\left[\frac{2*\max\{|\mathrm{Sin}X|, |\mathrm{Sin}(X+120)|, |\mathrm{Sin}(X=240)|\}}{3*Vp}\right]$$

Calculate the input current Ia:
For phase angle 60<X<120

$$Ia = Da*I_L$$
$$Da = 1$$
$$Ia = Vo*Io*\left[\frac{2*\mathrm{Sin}X}{3*Vp}\right]$$

For 180<X<240 (Phase B is maximum)

$$Da = \frac{Va}{Vb}$$
$$Ia = Da*I_L = Da*Io$$
$$Ia = \frac{Vp*\mathrm{Sin}X}{Vp*\mathrm{Sin}(X+120)}*Vo*Io*\left[\frac{2*\mathrm{Sin}(X+120)}{3*Vp}\right]$$
$$Ia = Io*\frac{2*Vo}{3*Vp}*\mathrm{Sin}X$$

Similar relationships are found at other phase angles. The phase A current Ia is sinusoidal at all angles of X, as required for pfc.

The analysis of the 0% boost converter anticipates analogous function to the 100% buck converter.

For the phase angle 60<X<120 degrees, the phase A boost switch Sa has a duty-cycle of 0, that is, it is always turned off. Vct is assumed to be at 0 V, and, due to the coupled primaries of the dc-dc transformer, by inspection, the voltage at the top capacitor is Va, and the voltage at the bottom capacitor is −Va, as shown.

The equations for a boost converter teach us that $$Vo = \frac{Vi}{1-D}$$

-continued $$-Va = \frac{Vb}{1-Db}$$
$$-Va = \frac{Vc}{1-Dc}$$

Rearranging:

$$Db = 1 - \frac{Vb}{Va}$$
$$Dc = 1 - \frac{Vc}{Va}$$

Thus, the duty-cycle for the 0% boost converter is 1 minus the duty-cycle given for the buck converter, for 60<X<120 degrees.

For any phase angle X:

$$Da = 1 - \frac{|\mathrm{Sin}X|}{\max\{|\mathrm{Sin}X|, |\mathrm{Sin}(X+120)|, |\mathrm{Sin}(X+240)|\}}$$
$$Db = 1 - \frac{|\mathrm{Sin}(X+120)|}{\max\{|\mathrm{Sin}X|, |\mathrm{Sin}(X+120)|, |\mathrm{Sin}(X+240)|\}}$$
$$Dc = 1 - \frac{|\mathrm{Sin}(X+240)|}{\max\{|\mathrm{Sin}X|, |\mathrm{Sin}(X+120)|, |\mathrm{Sin}(X+240)|\}}$$

These "ideal" duty-cycles ensure that the voltage across each inductor is 0 V on average. This does not ensure that the input currents are correct. In fact, the currents would never change.

To ensure that the input currents are correct, compare the voltage Vcvr, the "current vector reference," to the voltage Vct on the transformer center-tap. Any error in the input currents will cause a voltage difference between these nodes, and this error voltage can be used to tweak the duty-cycles to adjust the relative currents, using appropriate timing, feed-back gain, and compensation for stability.

The input currents are vectors and the vectors add to zero. The input currents must also be proportional to their respective voltage vectors, and the sum of the voltage vectors is the current vector reference Vcvr. If the input currents are not proportional to their respective input voltages, the error in the currents results in incorrect charge flow into and/or out of the capacitor divider, and the voltage Vct on the transformer center-tap will not equal the voltage Vcvr on the current vector reference.

A small shift in the duty-cycles of the non-dominant phases, under feedback control, is sufficient to adjust the voltages across the inductors slightly, to correct the currents flowing through them.

The circuits disclosed in this specification describe the points of novelty of the invention and other details as are necessary to understand and use the invention by one skilled in the art of power converters without undue experimentation. No representation is made that the circuits are complete practical circuits. Many ancillary circuits and components that are not novel and/or are not at the heart of the invention are necessary to make practical power converters, such as input filters, snubbers, transient protection, feed-back controls and their compensation, MOSFET drive circuits, timing circuits, circuits for passing signals through an isolation barrier, syn chronous rectifiers and their drivers and controls, output filters and so forth, as examples, not limitations. Once skilled in the art of power converters would know how to add these ancillary circuits and components and others for control and monitoring of the power converter for diverse applications without undue experimentation.

DEFINITIONS

"Modulator" or "power modulator" means a circuit in which the power in equals the power out (ideally—in practical modulators losses are small and are neglected for approximate calculations) and having means for adjusting its output voltage relative to its input voltage by varying its transfer ratio n:

Pi=Po

Vi*Ii=Vo*Io

Vo=n*Vi

Ii=n*Io

"Natural modulation" means that the duty-cycle is forced by a fixed algorithm, particularly an algorithm that has been optimized for efficient switching. The duty-cycle does not regulate the output voltage, but the output voltage is known and linearly tracks the input voltage.

"Duty-cycle" of a switch means the proportionate time that a switch is on during a cycle. "Duty-cycle" for a circuit means the proportionate time during a cycle that a specified condition is met, for example, not a limitation, the proportionate time that voltage is applied to an inductor through either of several switches. Duty-cycle may be expressed as a decimal fraction between 0 and 1.0 or as a percentage between 0 and 100%.

"100% duty-cycle" as defined for a buck 3-phase ac input means that there is no off-time. The switch duty-cycles are as follows:

$$Da = \frac{SinX}{max\{|SinX|, |Sin(X+120)|, |Sin(X+240)|\}}$$

$$Db = \frac{Sin(X+120)}{max\{|SinX|, |Sin(X+120)|, |Sin(X+240)|\}}$$

$$Dc = \frac{Sin(X+240)}{max\{|SinX|, |Sin(X+120)|, |Sin(X+240)|\}}$$

where X is the phase angle of the ac voltage, Da, Db and Dc are, respectively, the duty-cycles of the phase A, phase B and phase C switches. A negative duty-cycle result is interpreted as being a positive duty-cycle for a negative side switch. The duty-cycle for the phase with the highest voltage magnitude (the dominant phase) is 100%, and the sum of the duty-cycles of the other two phases equals 100%. In some embodiments of the invention, the input switches do double-duty as the buck switches, controlling the duty-cycle for power factor correction and as chopping switches to provide ac excitation to an ac-dc transformer. In such an embodiment, the duty-cycles above are interpreted as being the effective duty-cycle as it affects the input currents and their control, irrespective of the chopping function.

"0% duty-cycle" as defined for a boost 3-phase ac input means that the input is never short circuited line to line. The switch duty-cycles are as follows:

$$Da = 1 - \frac{|SinX|}{max\{|SinX|, |Sin(X+120)|, |Sin(X+240)|\}}$$

$$Db = 1 - \frac{|Sin(X+120)|}{max\{|SinX|, |Sin(X+120)|, |Sin(X+240)|\}}$$

$$Dc = 1 - \frac{|Sin(X+240)|}{max\{|SinX|, |Sin(X+120)|, |Sin(X+240)|\}}$$

where X is the phase angle of the ac voltage, Da, Db and Dc are, respectively, the duty-cycles of the phase A, phase B and phase C switches. The duty-cycle for the phase with the highest voltage magnitude (the dominant phase) is 0%, and switches of the other two phases are modulated to control their respective input currents.

"Dominant phase" means the phase of a 3-phase voltage that has the highest voltage magnitude at a given instant in time. The "non-dominant" phases are the two phases that do not have the highest voltage magnitude at a given instant of time.

A "dc-dc transformer" means a transformer together with a primary switching circuit and a secondary rectifying circuit so that the dc-dc transformer accepts a dc input voltage and provides a dc output voltage, usually with dielectric isolation and voltage shifting. A dc-dc transformer is a modulator with a fixed transfer ratio equal to its turns-ratio.

An "ac-dc transformer" means a transformer together with a secondary rectifying circuit so that the ac-dc transformer accepts an input voltage and provides a dc output voltage, usually with dielectric isolation and voltage shifting. An ac-dc transformer is a modulator with a fixed transfer ratio equal to its turns-ratio.

A "variable dc-dc transformer" means a transformer together with a primary switching circuit and a secondary rectifying circuit so that the variable dc-dc transformer accepts a dc input voltage and provides a dc output voltage, usually with dielectric isolation and voltage shifting. Further, it includes circuitry for varying the effective turns-ratio of the transformer. Reference is also made to U.S. patent application Ser. No. 11/423,957. A variable dc-dc transformer is a modulator with a variable transfer ratio equal to its varying effective turns-ratio. In reciting a variable dc-dc transformer or its function in this specification and the claims, the recitation may be to a dc-dc transformer and a power modulator, as it is equivalent.

A "variable ac-dc transformer" means a transformer together with a secondary rectifying circuit so that the variable ac-dc transformer accepts an ac input voltage and provides a dc output voltage, usually with dielectric isolation and voltage shifting. Further, it includes circuitry for varying the effective turns-ratio of the transformer. Reference is also made to U.S. patent application Ser. No 11/423,957. A variable ac-dc transformer is a modulator with a variable transfer ratio equal to its varying effective turns-ratio.

A "switch" is a means for switching that allows a current to flow essentially unimpeded when the switch is closed, or "on," and that prevents the flow of current when it is open, or "off." A switch may be an electronic component together with its logic, control and drive circuits, for example, not a limitation, a MOSFET, an NPN transistor, a SCR and so forth. A switch, by definition, has an "input" for connecting to a source of power or a circuit and an "output" for connecting to a load or another circuit.

An "ac switch" is a means for switching that can block voltage of either polarity when off and which will pass current of either polarity when on. Examples of ac switches include back to back MOSFETS, as an example, not a limitation. Reference is also made to U.S. patent application Ser. No. 11/619,127. The term "ac switch" is used when it is important to differentiate the switch from one that may block voltage of one polarity only, such as a MOSFET.

An "inductor" may be one or more inductors connected effectively in series, for example, not a limitation, an input filter inductor may be two inductors, one part on the input and one part on the return. An inductor, but definition, has an input and an output.

"3-phase ac" as it relates to 3-phase voltage, 3-phase current or 3-phase power means 3-phase commercial ac-power or its equivalent (from a transformer, generator, invertor or static power source, as examples, not limitations) as would be used in the jargon of the electrical trade and as it would be understood by one skilled in the art of power converters. A 3-phase power source has three wires, one for each phase, and a connection to 3-phase power means connection to these three wires. (There may be a fourth wire for a neutral connection, but this is not included unless specifically recited). The three phases of an ac power source normally have equal voltage magnitudes but phase angles that differ by increments of 120°, as would be known to one skilled in the art of power converters. In reciting the phase angle of a three phase ac, 0° is usually at the positive going zero crossing of the first phase, usually designated phase A. Instants of time during a cycle of the ac power are usually referred to by the phase angle with 360° representing an entire cycle. As an example, a time one fourth through an ac cycle may be referred to as 90°. For this specification and the claims, a recitation of "3-phase ac" includes multi-phase ac having fewer or more phases. As examples, not a limitation, a recitation of "3-phase ac" includes 2-phase power or 6-phase power. In this specification and the claims, a recitation of three switches to control 3-phase ac power includes two switches to control 2-phase ac power and multiple switches to control multi-phase ac power.

"Power factor correction", "power factor corrected" or "pfc" means that the input currents are controlled to be generally in phase with and proportionate to the input voltages. In the specification and the claims, correcting the flow of current from 3-phase inputs for power factor correction means that adjustments are made to the controlling parameters, usually the duty-cycles of the switches, so that the 3-phase input currents are made to be generally in phase with and proportionate to the 3-phase voltages.

"Normal voltage" means the nominal voltage with a small tolerance band above and below the nominal voltage, such as would be expected from commercial power or as the output of a regulated upstream power source. "Over-voltage" and "under-voltage" mean that the voltage is, respectively, above or below the normal voltage.

"Normal operation," in the context of the state of the input voltage, means operation when the input voltage is normal, that is, the nominal voltage with a small tolerance band above and below the nominal voltage.

In this specification and the claims, a recitation of a "connection to" or "connected to" may include a connection through another component or circuit in series. As an example, not a limitation, a buck switching circuit may be connected to an inductor and to a power modulator. This may be a series circuit of the buck switching circuit connected to the inductor then to the power modulator or it may be a series circuit of the buck switching circuit connected to the power modulator then to the inductor, as an example, not a limitation.

The invention claimed is:

1. A power factor corrected 3-phase ac-dc converter comprising phase A, phase B and phase C ac inputs for connecting respectively, individually, to three phases of a 3-phase ac power source,
   an output for connecting to and supplying a dc output voltage to a load,
   at least a first phase A switch, at least a first phase B switch and at least a first phase C switch having respective at least a first phase A switch input, at least a first phase B switch input and at least a first phase C switch input connected individually, respectively to the phase A, phase B and phase C ac inputs for controlling the flow of current from the respective phase A, phase B and phase C ac inputs
   the at least a first phase A switch, at least a first phase B switch and at least a first phase C switch having respective at least a first phase A switch output, at least a first phase B switch output and at least a first phase C switch output connected collectively to the input of an inductor, to comprise a 3-phase ac-dc buck converter, the at least a first phase A switch, at least a first phase B switch and at least a first phase C switch having respective duty-cycles Da, Db and Dc defined respectively, generally, for normal operation, in accordance with the equations $$Da = \frac{\operatorname{Sin} X}{\max\{|\operatorname{Sin} X|, |\operatorname{Sin}(X+120)|, |\operatorname{Sin}(X+240)|\}}$$

$$Db = \frac{\operatorname{Sin}(X+120)}{\max\{|\operatorname{Sin} X|, |\operatorname{Sin}(X+120)|, |\operatorname{Sin}(X+240)|\}}$$

$$Dc = \frac{\operatorname{Sin}(X+240)}{\max\{|\operatorname{Sin} X|, |\operatorname{Sin}(X+120)|, |\operatorname{Sin}(X+240)|\}}$$

where "X" is a phase angle of the 3-phase ac power source, the ac-dc buck converter being connected to a power modulator having a transfer ration n and means for controlling the transfer ratio n so as to adjust the transfer ratio n to regulate the dc output voltage.

2. The power factor corrected 3-phase ac-dc converter of claim 1 wherein the power modulator is a variable dc-dc transformer.

3. The power factor corrected 3-phase ac-dc converter of claim 1 wherein the power modulator is a variable ac-dc transformer.

4. The power factor corrected 3-phase ac-dc converter of claim 1 further comprising a dc-dc transformer and wherein the power modulator is a boost converter.

5. The power factor corrected 3-phase ac-dc converter of claim 1 wherein the power modulator is a boost converter.

6. The power factor corrected 3-phase ac-dc converter of claim 1 wherein the at least a first phase A switch, the at least a first phase B switch and the at least a first phase C switch are each a rectifier in series with a switch.

7. The power factor corrected 3-phase ac-dc converter of claim 1 wherein the at least a first phase A switch the at least a first phase B switch and the at least a first phase C switch are ac switches.

8. The power factor corrected 3-phase ac-dc converter of claim 1 further comprising means for reducing the duty-cycles Da, Db and Dc for over-voltage operation.

9. A power factor corrected 3-phase ac-dc converter comprising phase A, phase B and phase C ac inputs for connecting respectively, individually, to three phases of a 3-phase ac power source, an output for connecting to and supplying a dc output voltage to a load, phase A, phase B and phase C inductors having, respectively, phase A, phase B and phase C inductor inputs and phase A, phase B and phase C inductor outputs the respective phase A, phase B and phase C inductors inputs being respectively, individually, connected to the phase A, phase B and phase C inputs phase A, phase B and phase C switches having respective phase A, phase B and phase C switch inputs connected individually, respectively to the phase A, phase B and phase C inductor outputs for controlling the flow of current from the respective phase A, phase B and phase C ac inputs, a dc-dc transformer having a positive start terminal, a center-tap terminal and a negative end terminal as its inputs and having positive and negative output terminals, phase A, phase B and phase C positive boost rectifiers having respective phase A, phase B and phase C positive boost rectifier inputs connected individually, respectively to the phase A, phase B and phase C inductor outputs, the phase A, phase B and phase C positive boost rectifiers having respective phase A, phase B and phase C positive boost rectifier outputs connected collectively to the positive start terminal of the dc-dc transformer, phase A, phase B and phase C negative boost rectifiers having respective phase A, phase B and phase C negative boost rectifier inputs connected individually, respectively to the phase A, phase B and phase C inductor outputs, the phase A, phase B and phase C negative boost rectifiers having respective phase A, phase B and phase C negative boost rectifier outputs connected collectively to the negative end terminal of the dc-dc transformer, the phase A, phase B and phase C switches having respective phase A, phase B and phase C switch outputs connected collectively to the center-tap terminal of the dc-dc transformer, to comprise a 3-phase ac-dc boost converter, the phase A, phase B and phase C switches having respective duty-cycles Da, Db and Dc defined respectively, nominally, generally, for normal operation, in accordance with the equations $$Da = 1 - \frac{|SinX|}{\max\{|SinX|, |Sin(X+120)|, |Sin(X+240)|\}}$$

$$Db = 1 - \frac{|Sin(X+120)|}{\max\{|SinX|, |Sin(X+120)|, |Sin(X+240)|\}}$$

$$Dc = 1 - \frac{|Sin(X+240)|}{\max\{|SinX|, |Sin(X+120)|, |Sin(X+240)|\}}$$

where "X" is a phase angle of the 3-phase ac power source, the power factor corrected 3-phase ac-dc converter further comprising a current reference for the respective flow of current from the phase A, phase B and phase C ac inputs, means for determining the flow of current from the respective phase A, phase B and phase C ac inputs, means for comparing the current reference to the flow of current from the respective phase A, phase B and phase C ac inputs to determine a current error signal representative of the difference between the current reference and the flow of current from the respective phase A, phase B and phase C ac inputs, means for adjusting the respective duty-cycles Da, Db and Dc responsive to the current error signal so as to correct the flow of current from the phase A, phase B and phase C ac inputs for power factor correction, the ac-dc boost converter being connected to a power modulator having a transfer ration n and means for controlling the transfer ratio n so as to adjust the transfer ratio n to regulate the dc output voltage.

10. The power factor corrected 3-phase ac-dc converter of claim 9 wherein the power modulator is a variable dc-dc transformer.

11. The power factor corrected 3-phase ac-dc converter of claim 9 further comprising a dc-dc transformer and wherein the power modulator is a buck converter.

12. The power factor corrected 3-phase ac-dc converter of claim 9 wherein the power modulator is a buck converter.

13. The power factor corrected 3-phase ac-dc converter of claim 9 further comprising means for increasing the duty-cycles Da, Db and Dc for under-voltage operation.

14. The power factor corrected 3-phase ac-dc converter of claim 9 wherein when the voltage of the phase A, phase B and phase C inputs individually cross zero volts, the respective duty-cycle Da, Db and Dc are respectively, individually, momentarily set to zero so as to force discontinuous conduction in the respective phase A, phase B and phase C inductors and force the respective phase A, phase B and phase C input currents to zero.

15. The power factor corrected 3-phase ac-dc converter of claim 9 wherein the duty-cycles Da, Db and Dc are set to zero for an over-voltage condition of the 3-phase ac power source.

16. A 3-phase duty-cycle controller for controlling respectively, individually, phase A, phase B and phase C input currents flowing from respective phase A, phase B and phase C inputs from a 3-phase ac power source for power factor correction in a power factor corrected 3-phase ac-dc power converter by varying respective duty-cycles Da, Db and Dc respectively, individually, of phase A, phase B and phase C input current control switches of the power factor corrected 3-phase ac-dc power converters comprising a three-legged voltage divider comprising respective phase A, phase B and phase C current reference resistors having essentially equal resistance value and connected as a "Y" connection respectively, individually, to the respective phase A, phase B and phase C inputs of the 3-phase ac power source so as to generate a current vector reference voltage as a voltage on a common connection of the three-legged voltage divider;

to generate a phase A input current vector reference as a voltage proportionate to the voltage difference between phase A input of the 3-phase ac power source and the current vector reference voltage;

to generate a phase B input current vector reference as a voltage proportionate to the voltage difference between the phase B input of the 3-phase ac power source and the current vector reference voltage; and to generate a phase C input current vector reference as a voltage proportionate to the voltage difference between the phase C input of the 3-phase ac power source and the current vector reference voltage;

means for controlling the sequence and timing of the duty cycle of the phase A input current control switch responsive to the phase A input current vector reference;

means for controlling the sequence and timing of the duty cycle of the phase B input current control switch responsive to the phase B input current vector reference; and means for controlling the sequence and timing of the duty cycle of the phase C input current control switch responsive to the phase C input current vector reference;

so that the phase A input current is proportionate to and in phase with the phase A input current vector reference;

the phase B input current is proportionate to and in phase with the phase B input current vector reference; and the phase C input current is proportionate to and in phase with the phase C input current vector reference.

17. The 3-phase duty-cycle controller of claim 16 further comprising phase A, phase B and phase C inductors having, respectively, phase A, phase B and phase C inductor inputs and phase A, phase B and phase C inductor outputs, the respective phase A, phase B and phase C inductors inputs being respectively, individually, connected to the phase A, phase B and phase C inputs, phase A, phase B and phase C switches having respective phase A, phase B and phase C switch inputs connected individually, respectively to the phase A, phase B and phase C inductor outputs for controlling the flow of current from the respective phase A, phase B and phase C ac inputs, a dc-dc transformer having a positive start terminal, a center-tap terminal and a negative end terminal as its inputs and having positive and negative output terminals, phase A, phase B and phase C positive boost rectifiers having respective phase A, phase B and phase C positive boost rectifier inputs connected individually, respectively to the phase A, phase B and phase C inductor outputs, the phase A, phase B and phase C positive boost rectifiers having respective phase A, phase B and phase C positive boost rectifier outputs connected collectively to the positive start terminal of the dc-dc transformer, phase A, phase B and phase C negative boost rectifiers having respective phase A, phase B and phase C negative boost rectifier inputs connected individually, respectively to the phase A, phase B and ac phase C inductor outputs, the phase A, phase B and phase C negative boost rectifiers having respective phase A, phase B and phase C negative boost rectifier outputs connected collectively to the negative end terminal of the dc-dc transformer, the phase A, phase B and phase C switches having respective phase A, phase B and phase C switch outputs connected collectively to the center-tap terminal of the dc-dc transformer, to comprise a 3-phase ac-dc boost converter, means for adjusting the respective duty-cycles Da, Db and Dc responsive to the current error signal so as to correct the flow of current from the phase A, phase B and phase C ac inputs for power factor correction responsive to a difference voltage between the current vector reference voltage and a voltage of the center-tap terminal of the dc-dc transformer.

* * * * *